US006666538B2

(12) United States Patent
Yamano

(10) Patent No.: US 6,666,538 B2
(45) Date of Patent: Dec. 23, 2003

(54) RECORDING METHOD OF MEDICAL IMAGE AND APPARATUS FOR RECORDING MEDICAL IMAGE

(75) Inventor: Akira Yamano, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/205,128

(22) Filed: Jul. 24, 2002

(65) Prior Publication Data

US 2003/0132999 A1 Jul. 17, 2003

(30) Foreign Application Priority Data

Jul. 30, 2001 (JP) ....................................... 2001-228965

(51) Int. Cl.[7] ............................ B41J 2/205; H04N 1/46

(52) U.S. Cl. .......................................... 347/15; 358/506

(58) Field of Search .............................. 347/15, 43, 14; 358/506, 1.9

(56) References Cited

U.S. PATENT DOCUMENTS 6,443,548 B1 * 9/2002 Takayama et al. ............ 347/14

* cited by examiner

*Primary Examiner*—Lamson D Nguyen
(74) *Attorney, Agent, or Firm*—Squire, Sanders & Dempsey

(57) ABSTRACT

A recording method of a medical image comprising: jetting ink onto a recording medium to make the medical image, wherein a reflection density vs. transmission density characteristic curve of the recorded medical image is monotone non-decreasing in the range of the transmission density being not more than 2.0

14 Claims, 12 Drawing Sheets

FIG. 6 ( a )
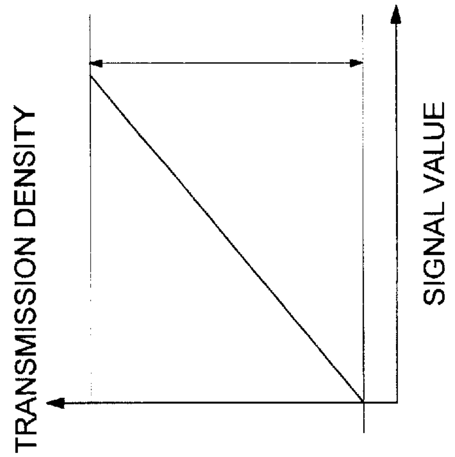
FIG. 6 ( b )
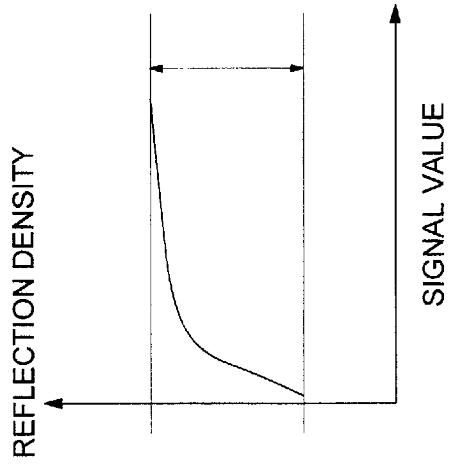
FIG. 6 ( c )
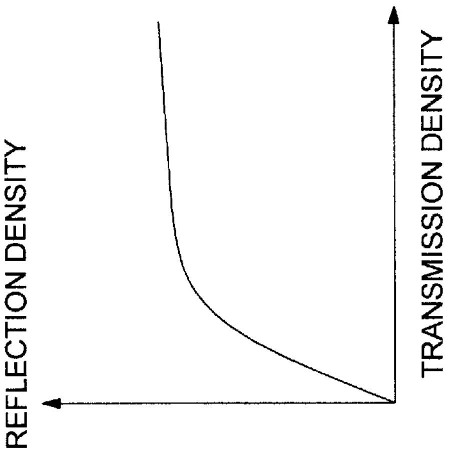
FIG. 6 ( d )
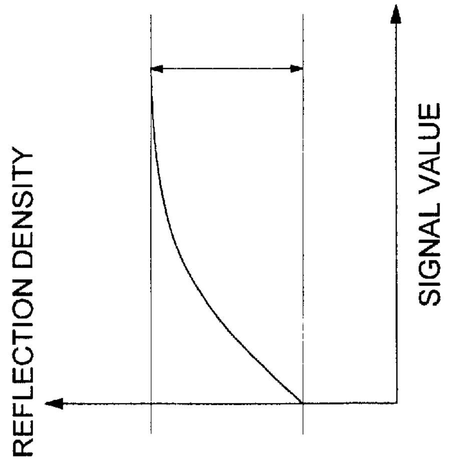
FIG. 6 ( e )
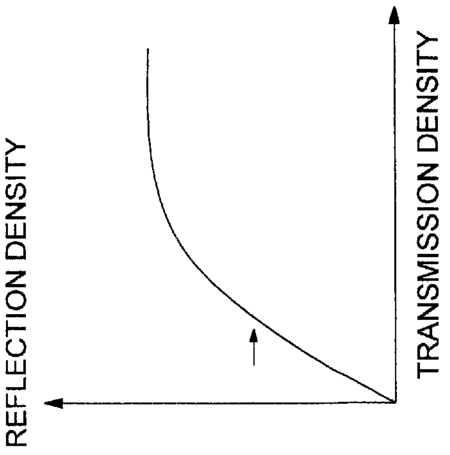

FIG. 8 ( a )

| | |
|---|---|
| LU | RU |
| LL | RL |

FIG. 8 ( b )

| | LU | RU | LL | RL |
|---|---|---|---|---|
| ① | ● | ● | ● | |
| ② | ● | ● | ● | ○ |
| ③ | ○● | ● | ● | ○ |
| ④ | ○● | ○● | ● | ○ |
| ⑤ | ○● | ○● | ○● | ○ |
| ⑥ | ●○ | ● | ● | ○ |
| ⑦ | ●○ | ●○ | ● | ○ |
| ⑧ | ●○ | ●○ | ●○ | ○ |

FIG. 8 ( c )

RECORDING METHOD OF MEDICAL IMAGE AND APPARATUS FOR RECORDING MEDICAL IMAGE

FIELD OF THE INVENTION

This invention relates to a recording method of medical image and a medical image recording apparatus capable of producing a medical image which has such a high quality as to be fit for diagnosis as a transmission image and is of such a good image quality that it never produces reversing of density gradation when it is observed as a reflection image.

BACKGROUND OF THE INVENTION

In recent years, in X-ray radiography, in place of an SF system, a system for picking up a digital electrical signal of an X-ray image such as a computed radiography (CR) system or a system employing a flat panel X-ray detector (FPD) has appeared. With the spreading of what is called a digital X-ray image pickup apparatus, also a digital medical-use image recording apparatus for recording a medical image on the basis of an electrical signal obtained by a CR system or an FPD system is spreading.

A recording method which has now become the greatest mainstream is a silver halide laser writing method in which an image is formed through converting an electrical signal of an X-ray image obtained by a CR system or an FPD system into laser beam intensity variation and carrying out print and development processing on a conventional silver halide film. However, because the method uses a silver halide film in the same way as a conventional method, there is a problem that it is troublesome and costs much.

As regards a method not using a silver halide film, a thermal transfer method or a sublimation-type printer can be considered. However, in the case of a thermal transfer method, the ink of a recorded image is present on the uppermost surface of a film, which produces a trouble such that ink is easy to be transferred in handling. Further, in the case of a sublimation-type printer, sufficient density cannot be obtained and waste matter such as an ink ribbon is produced after image formation as in the case of a thermal transfer method.

Lately, an image recording apparatus employing an ink jet method has become versatile as a small-sized low-priced printer, which enables the great improvement of the resolution and quality of a recorded image. Therefore, by applying an ink jet recording apparatus to X-ray image formation, the above-mentioned trouble is to be solved, and it is expected that an ink jet image forming method capable of forming an X-ray image which is made of low cost and easy to observe by making the most of the advantage of an ink jet printer can be provided.

Now, it is a subject in an image recording apparatus of not only an ink jet method but also all other recording methods that, for a medical image used mainly in diagnosis, an extremely high image quality is required.

It is said that the number of gray levels in a simple X-ray radiograph required for diagnosis is 10 bits (=1024 gray levels), and further, the number of gray levels enabling sufficient diagnosis is 12 bits (=4096 gray levels). In the case where an image of multiple gray levels such as a medical image is expressed by an ink jet method, because the number of ink density levels is limited, it is necessary to make the gradation expression of a recorded image in a digital way. For example, there is a method in which one pixel of image data is composed of a matrix having a plurality of elements, for example, a dither matrix of 4×4 elements, and gradation expression of 4×4+1=17 gray levels is achieved by using so called a dither method with this dither matrix made a unit.

Further, by using a plurality of kinds of ink, for example 4 kinds of ink, having colors of the same hue but different densities respectively, the number of gray levels to be produced can be increased innumerably. However, actually it is general that gradation expression is made on the basis of an error diffusion method by selecting several to several tens of dither matrices out of all the dither matrices that are able to be produced and utilizing these several to several tens of dither matrices. As regards the literatures concerning an error diffusion method, for example, it is described in detail in 'R. FLOYD & L. STEINBERG, "AN ADAPTIVE ALGORITHM FOR SPATIAL GRAY SCALE", SID 75 DIJEST, pp. 36 to 37'. By using this method composed of a dither method combined with an error diffusion method, multiple gray scale expression of 12 bits is possible, and by selecting suitable dither matrices and using a suitable error diffusion algorithm, it is possible to obtain a smooth gradation characteristic.

However, the above-mentioned error diffusion method is what is called an area-modulation method, and has the defect that it makes the roughness (noise) of an image larger as the compensation against the advantage that it is capable of expressing multiple gray levels. Therefore, it is necessary to increase the number of dither matrices to the utmost, but because the number of densities of the ink having the same hue is limited, it is often used a method in which the number of gradations is increased by shooting ink drops of different densities approximately at the same position.

As described in the publication of the examined patent application H5-46744, it has been known an invention utilizing the fact that the reflection density in the case where high-density dots and low-density dots are formed in a superposed way at the same cell in a dot matrix is different from that in the case where high-density dots and low-density dots are formed at different cells respectively in the above-mentioned dot matrix. Further, there is a method in which multiple gray level expression is made by utilizing positively the difference in the recording density to be produced by varying the order of superposing as keeping constant the number of the high-density and low-density dots.

As described in the publication of the unexamined patent application H3-218851, there is a method in which recording is done first with high-density ink and successively with low-density ink superposed. It is a method utilizing the nature such that, in a reflection image, in the case where recording is made with low-density ink followed by high-density ink, it appears as if a large dot of high-density ink is shot, which increases graininess, but in the case of high-density ink followed by low-density ink, a dot appears not so large as that in the former case.

It has been known that the above-mentioned two methods are appropriate recording methods for recording a reflection image, but the effect of the above-mentioned methods could not be obtained for a transmission image. On the contrary, in the case where an image is recorded by an ink jet method, they have rather the defect that the gradation is reversed in a part of an image in accordance with the order of shooting ink drops of different densities. It is considered that a transmission image has a characteristic which is proper to a transmission image and there is a method appropriate for the recording of a transmission image which is different from that of recording a reflection image.

The phenomenon that gradation is reversed is a problem peculiar to an ink jet method; however, in the first place, to use both a transmission image and a reflection image has been regarded as difficult in various image recording methods such as a silver halide method, a thermal transfer method, and other methods. Among various reasons which can be cited, the most difficult reason is the difference in the density characteristic between a transmission image and a reflection image.

FIG. 5 is a drawing showing a typical reflection density vs. transmission density characteristic. The detail is described in 'Yasushi Ohyama, "The relation between transmission density and reflection density of a photographic image layer", Journal of Japan Photographic Society, 41(1), pp. 42 to 59 (1978)'. As regards this characteristic, it is not limited to a silver halide photography, but a similar tendency can be observed also in a recording apparatus of an ink jet method. The reason is that the structure of the recording medium is hardly different between ink jet recording and silver halide photographic recording, and the difference is only that silver particles as the image forming element are substituted by a dye material or a pigment material.

In cases where an image is recorded by a conventional ink jet method, recording is made separately for a transmission medium and for a reflection medium in most cases; therefore, it has been necessary to prepare respective gradation tables for expressing a gradation of a reflection image and a transmission image. The greatest reason for the incompatibility of a gradation table between a reflection image and a transmission image is that the above-mentioned reflection vs. transmission density characteristic is non-linear, which causes the gradation characteristics of both to appear different. Up to now, in accordance with use, it has usually been put in practice that either a transmission image or a reflection image was formed by an image forming method that is suitable to one or the other.

However, in some cases it is very convenient to use one sheet of a recorded image either way in accordance with the purpose of use. For example, in the case where a recorded medical image is used as it is for a patient's chart, diagnosing can be done by using it as a transmission image, and even in the case where a light box is not provided near by, it can be used for the explanation to the patient as a reflection image; this is convenient.

However, if an image which has been recorded by using a gradation method for a transmission medium is observed as a reflection image, there is a high possibility of producing the gradation reversing which is peculiar to an ink jet method; this is a problem. There is also a risk to cause the diagnosis to become erroneous if it is used as a reflection image through an error. Further, if an image which has been recorded by using a gradation method for a reflection medium is observed as a transmission image, there is a high possibility of producing this reversing of gradation in the same way, and there is a risk to cause the diagnosis to become erroneous if it is used as a transmission image through an error; this is also a problem.

SUMMARY OF THE INVENTION

This invention has been made in view of the above-mentioned actual situation, and it is its object to provide a recording method of medical image and a medical image recording apparatus capable of producing a medical image which has such a high quality as to be fit for diagnosis as a transmission image and is of such a good image quality that it never produces reversing of density gradation when it is observed as a reflection image.

For the purpose of solving the above-mentioned problems and accomplishing the object, this invention has the structures described below.

[Structure 1]

A recording method of a medical image comprising:

jetting ink onto a recording medium to make the medical image, wherein a reflection density vs. transmission density characteristic curve of the recorded medical image is monotone non-decreasing in the range of the transmission density being not more than 2.0.

[Structure 2]

The recording method of Structure 1, wherein the recording medium has a transmission density of 0.15 to 0.40.

[Structure 3]

The recording method of Structure 2, wherein a visual density VD of the recording medium and a blue light density BD of the recording medium satisfy the following relation:

$$BD/VD \geqq 0.25.$$

[Structure 4]

The recording method of Structure 1, wherein the difference between the transmission density and the reflection density of the same point of the recorded medical image is not more than 1.0 in the range of the transmission density being not more than 2.0.

[Structure 5]

The recording method of Structure 4, wherein the difference between the transmission density and the reflection density is not more than 0.7.

[Structure 6]

The recording method of Structure 4, wherein, in the jetting step, a plurality of ink drops are jetted onto substantially same point of the recording medium.

[Structure 7]

The recording method of Structure 6, wherein the medical image is recorded in a resolution of not less than 360 dots/25.4 mm.

[Structure 8]

The recording method of Structure 1, wherein a slope of tangent line of a point in the range of the transmission density being not more than 1.0 on the reflection density vs. transmission density characteristic curve is not more than 2.3.

[Structure 9]

A recording method of a medical image comprising: jetting ink onto a recording medium to make the medical image, wherein the difference between a transmission density and a reflection density of the same point of the recorded medical image is not more than 1.0 in the range of the transmission density being not more than 2.0.

[Structure 10]

The recording method of Structure 9, wherein the difference between the transmission density and the reflection density is not more than 0.7.

[Structure 11]

The recording method of Structure 9, wherein, in the jetting step, a plurality of ink drops are jetted onto substantially same point of the recording medium.

[Structure 12]

The recording method of Structure 11, wherein the medical image is recorded in a resolution of not less than 360 dots/25.4 mm.

[Structure 13]

An apparatus to recording a medical image onto a recording medium by the recording method described in claim 1, the apparatus comprising a plurality of recording heads being capable of jetting a plurality of inks having the same color hue and different concentrations from each other, wherein the recording heads are arrayed in the approximately perpendicular direction to the conveying direction of the recording medium, and in the order of the concentration of the ink in the recording head.

[Structure 14]

The apparatus of Structure 13, wherein the recording heads move backwards and forwards in the approximately perpendicular direction to the conveying direction of the recording medium, the recording heads jet the ink on one way of the backwards movement and the forwards movement, and the recording head are arrayed in descending order of the concentration of the inks in the recording heads along the way, on which the ink is jetted.

By this invention, it is possible to make the reversing of density not occur particularly in low to medium density region in a reflection density vs. transmission density characteristic curve. Further, in a reflection density vs. transmission density characteristic curve, by limiting the gradient of the characteristic curve in the low to medium density region, it is possible not to produce a large difference in gradation between transmission image and reflection image. Moreover, it is desirably used a method in which a plurality of ink drops are shot approximately at the same position repeatedly, reflection density is controlled by combining the order of jetting and the densities of used ink, and a low-density ink drop is shot last.

In this way, an image having a high image quality as a transmission image or also as a reflection image can be produced.

The term "density" used in the invention represents what is called an optical density D, and is defined by $Dt=-\log_{10}T$ or $Dr=-\log_{10}R$. It means diffuse light density measured by, for example, an optical densitometer PDA-65 (manufactured by Konica Corp.). In addition, T and R denote light transmittance and light reflectance respectively; the former density Dt is one called transmission density, and the latter density Dr is one called reflection density. Because the invention can be applied to both densities of transmission density and reflection density, the term density represents either of the transmission and reflection density unless otherwise specified. Further, the term "image density" means a density which an image has, and represents an overall image density including the density caused by a recording material (such as ink) adhering to a recording medium and the density caused by the recording medium.

The term "transmission recording medium" used in the invention means a recording medium to be used mainly for observing an image as a transmission image, and the term "reflection recording medium" used in this invention means a recording medium to be used mainly for observing an image as a reflection image. The term "transmission image" means an image to be observed in a form of transmission image observation. In the form of transmission image observation, an assistant light-source, which has a capability of emitting a high-intensity light, is provided on the backside of the image, and the transmission light, which is emitted from the assistant light-source and transmits the image, is used for observing the image. The assistant light-source provided on the backside of the image is usually referred a backlight. The term "reflection image" means an image to be observed in a form of reflection image observation. In the form of reflection image observation, an assistant light-source is provided at the front of the image, and the reflection light, which is emitted from the assistant light-source and is reflected by the image, is used for observing the image.

The term "a density gradation characteristic" used in the invention means a characteristic showing the relation between the signal value (abscissa) in an image signal and the density (ordinate) of the image recorded on a recording medium on the basis of the signal value, and an image recording apparatus records an image on a recording medium on the basis of this density gradation characteristic.

The term "a reflection density vs. transmission density characteristic curve" used in the invention means a characteristic showing the relation between the transmission density (abscissa) and the reflection density (ordinate) of a recording medium recorded thereon an image on the basis of a specified signal value. The term "monotone non-decreasing" of a reflection density vs. transmission density characteristic curve represents a characteristic such that the reflection density does not decrease with the increase of the transmission density (that is, the reflection density increases or keeps a constant value) in a predetermined range of the transmission density.

Visual Density (VD) in this invention represents a diffuse transmission light, which satisfies the Spectral Condition of the visual density defined in ISO 5/3–1995 (Spectral Condition of the density measurement) and the Geometrical Condition defined in ISO 5/2–1984 (Geometrical Condition of the transmission density measurement), and it is conventionally used in the art. Blue Light Density (BD) in this invention represents a blue light density, which satisfies the Spectral Condition of "Status A" defined in ISO 5/3–1995 and the Geometrical Condition defined in ISO 5/2–1984. The term "BD/VD" used in this invention means the ratio of the blue light density (BD) to the visible light density (VD). For example, in the case where an optical densitometer PDA-65 (manufactured by Konica Corp.) is used, BD/VD can be obtained by measuring the density with an amber filter for VD and a blue filter for BD used.

The term "resolution of an image recording apparatus" means an index represents the recording density of an image recording apparatus, and the unit dpi (dots per inch: 1 inch=about 25.4 mm) is generally used. For example, at a resolution of 360 dpi, the minimum recording size to be controlled by the image recording apparatus (hereinafter referred to as "the minimum recording size") is equivalent to 25400 $\mu$m/360 dpi=about 70 $\mu$m. Further, the term "an output pixel size" means an output size corresponding to one pixel in an image signal, and it satisfies at least the relation (output pixel size)$\geqq$(minimum recording size).

BRIEF DESCRIPTION OF THE DRAWINGS

FIG. 6(*a*) to FIG. 6(*e*) are graphs showing the comparison of gradation characteristics;

PREFERRED EMBODIMENT OF THE INVENTION

In the following, an image recording method for medical use and an image recording apparatus for medical use of this invention will be explained in detail on the basis of the drawings, but this invention is not to be limited to this embodiment.

{Structure of Ink Jet Recording Apparatus}

Image formation on a recording medium in this invention is practiced through outputting an image by what is called an ink jet method in which an image is formed by the jetting of ink fine particles based on an inputted image signal by a method based on piezoelectric effect known to public or utilizing the inflation of bubbles by heating.

Figure 1:
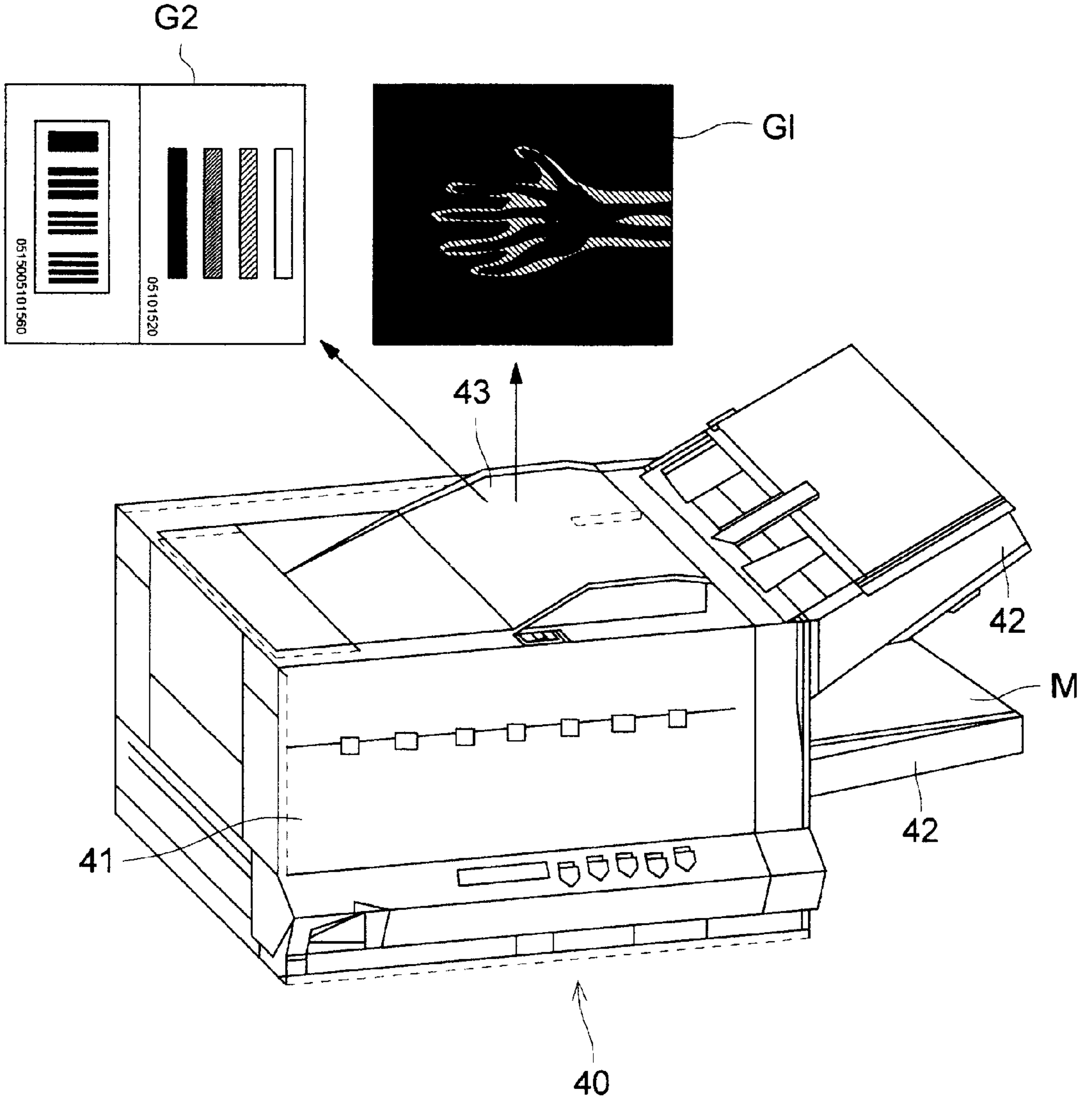
FIG. 1 is a perspective view of an ink jet recording apparatus.

In the following, this invention will be explained with reference to the embodiment. FIG. 1 is a perspective view of an ink jet recording apparatus 40 which is a medical image forming apparatus of this example of the embodiment.

The ink jet recording apparatus 40 is capable of applying quasi-halftone processes such as error diffusion and dither to inputted image data, and forming an image having halftone by attaching ink to a recording medium by an ink jet method on the basis of the processed image data. This ink jet recording apparatus 40 feeds a recording medium M which is set in a feed tray 42, which is one, for example lower one, of the feed trays 42 mounted, for example, in two stages to the apparatus mainframe 41, to the inside of the apparatus mainframe 41, and the recording medium M having images G1 and G2 formed on it is taken out on an ejection portion 43.

Figure 2:
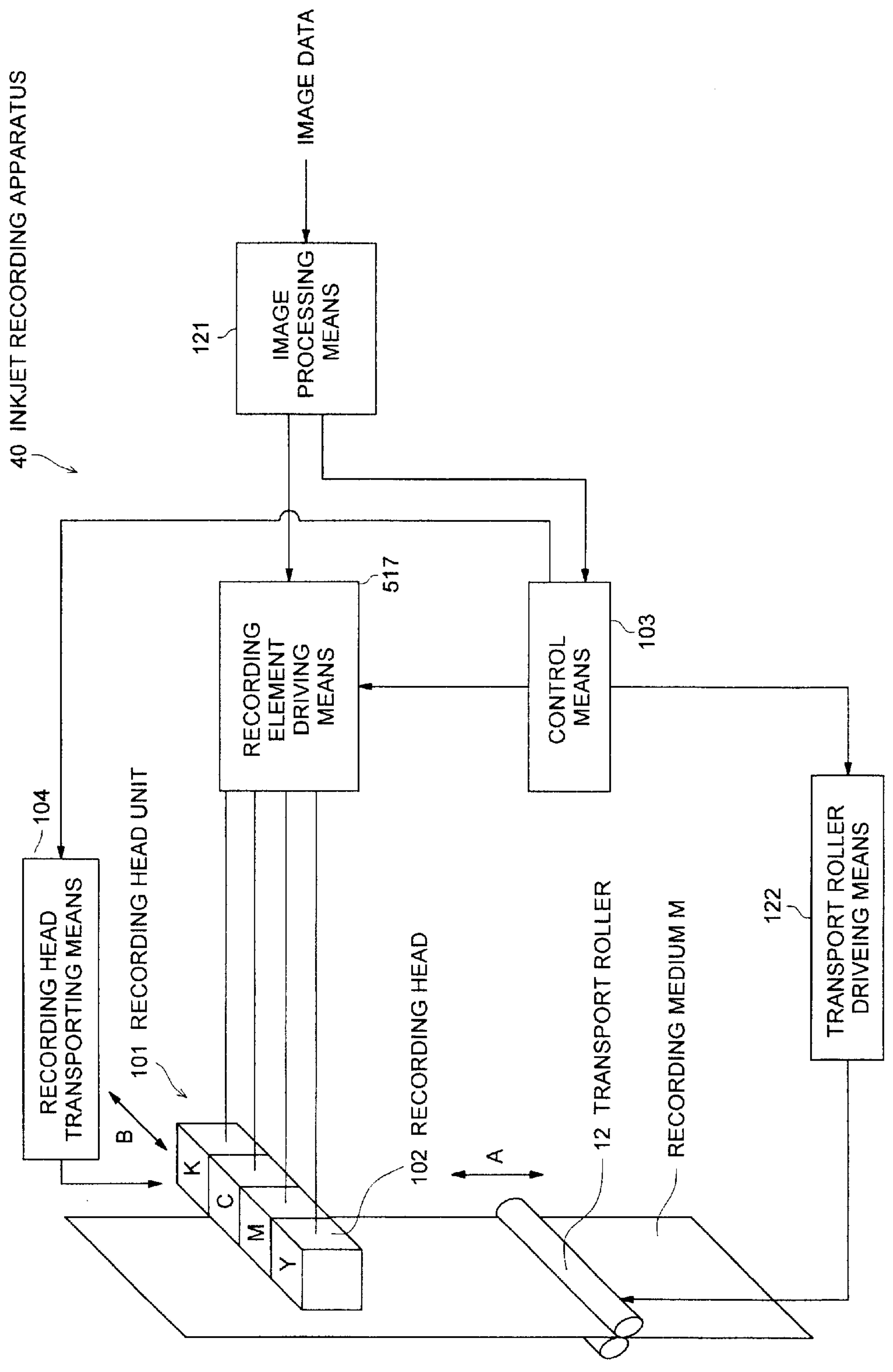
FIG. 2 is a block diagram showing the outline structure of the ink jet recording apparatus shown in the perspective view.

FIG. 2 is a block diagram showing the outline structure of the ink jet recording apparatus 40. The ink jet recording apparatus 40 of this example of the embodiment is equipped with a pair of transport rollers 12 as a recording medium transporting means, a transport roller driving means 122, a recording head unit 101 as an image forming means, a recording head transport means 104, a control means 103, a recording element driving means 517, and an image processing means 121.

The image processing means 121 applies image processing to inputted image data, and an image signal consisting of the processed image data is transmitted to the control means 103 and to the recording element driving means 517. The control means 103 controls the transport roller driving means 122, by which the pair of transport rollers 12 are driven.

The pair of transport rollers 12 transport the recording medium M to the direction of the arrow mark A (sub-scanning direction) on the basis of a recording medium transport signal. The recording head unit 101 is arranged movably in the direction perpendicular to this transporting direction of the recording medium M.

In this example of the embodiment, in this recording head unit 101, recording heads 102 of yellow (Y), magenta (M), cyan (C), and black (K) are arranged in an array. These recording heads 102 may be integrally formed or may be separately provided individually. The recording head transport means 104 moves the recording head unit 101 to the direction of the arrow mark B (main scanning direction) on the basis of a head transport signal from the control means 103.

The recording element driving means 517 drives each of the recording heads 102 in response to an image signal from the image processing means 121 on the basis of a recording head controlling signal from the control means 103, to form an image on the recording medium M.

Figure 3:
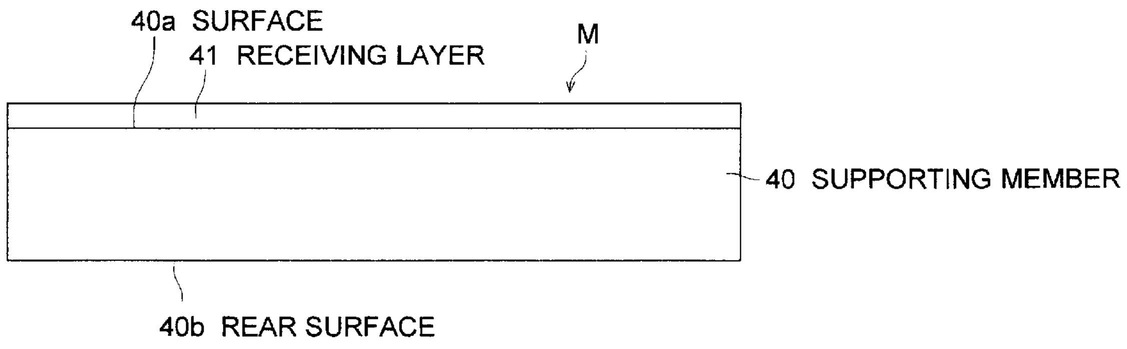
FIG. 3 is a drawing showing the outline structure of a recording medium.
Figure 4:
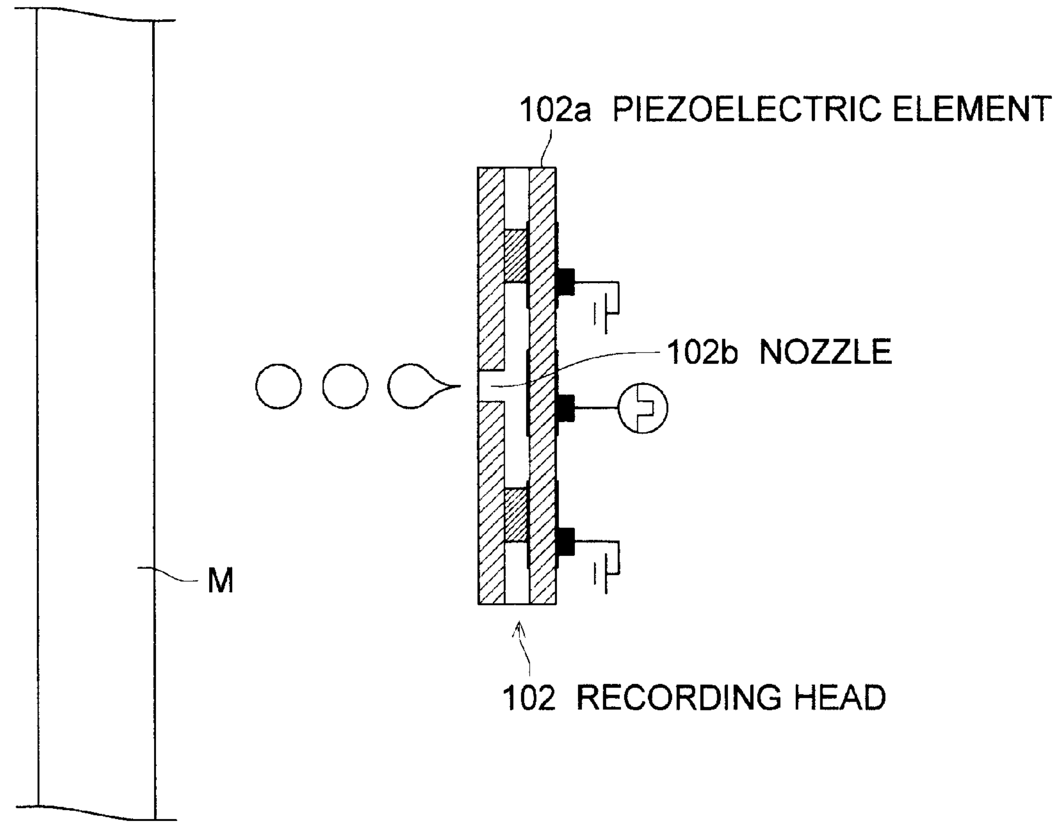
FIG. 4 is a drawing showing the structure of an image recording.

FIG. 3 shows the outline structure of a recording medium. FIG. 4 is a drawing showing the structure of an image recording. The recording medium M is composed of a receiving layer 41 which is easy to absorb ink formed on the surface 40*a* of a transparent supporting member 40, and an image is to be recorded in this receiving layer 41. It is desirable to provide a back-coat layer having functions such as curl preventing, preventing the adherence to other recording medium sheet, and charge preventing, because it makes the recording medium easy to handle. Further, it is desirable to provide a layer having a function of reflection reducing on the front surface (print surface) only or on the front surface and the rear surface (non-print surface), because it can reduce reflection light and makes diagnosis easy to perform.

FIG. 4 is a structural drawing of recording method utilizing an example of the recording head shown in FIG. 2. In the drawing, it has a structure such that, in the neighborhood of the nozzle 102*b* of each recording head 102, there is provided a piezoelectric element 102*a*, which makes the nozzle expand and contract by an electric voltage applied to the element, and ink drops are jetted from the front end of the nozzle towards the recording medium M.

It is preferable that the recording medium M has a transparent supporting member, but an opaque supporting member can be used so long as it satisfies the structural condition of this invention. For example, for a transparent supporting member, one described in the publication of the unexamined patent application H10-76751, and for an opaque supporting member, one described in the publication of the unexamined patent application H9-254521 can be desirably used.

As regards the transparent supporting member, it is made of polyester obtained by condensation polymerization of diol and dicarboxylic acid. A desirable dicarboxylic acid includes terephthalic acid, isophthalic acid, phthalic acid, naphthalene dicarboxylate, adipic acid, and sebacic acid. A desirable diol includes ethylene glycol, trimethylene glycol, tetramethylene glycol, and cyclohexane dimethanol. A specified polyester which is suitable to be used in this invention includes polyethyleneterephthalate, polyethylene-p-hydroxybenzoate, poly-1,4-cyclohexylenedimethyleneterephthalate, and polyethylene-2,6-naphthalenecarboxylate. Polyethyleneterephthalate is the most desirable polyester for the supporting member owing to its excellent water-resisting nature, chemical stability, and durability.

As regards the opaque supporting member, non-coat-processed papers such as wood-free paper, wood-containing paper, super calendared paper, machine-glazed base paper, and tracing paper, coated papers such as art paper, coat paper, light-weight coat paper, ultra light-weight coat paper, and cast-coated paper, films such as a plastic film, an opaque film containing pigment, and foamed film, resin-filmed paper, resin-impregnated paper, nonwoven fabric, cloth, and complex material of these can be used. Among these, resin-filmed paper and films of various kinds are desirable from the viewpoint of glossiness and smoothness, and resin-filmed paper and polyolefin film are more desirable from the viewpoint of touch and feeling of high quality.

The receiving layer is formed on the supporting member by coating, and it is desirable that the receiving layer coated on this supporting layer contains a binder composed of a water-soluble polymer and a water-insoluble polymer. As regards the amount of this combination of a water-soluble polymer and a water-insoluble polymer, the water-insoluble polymer is contained with an amount of at least 15% by weight and not more than 90% by weight; further, it is desirable that an inorganic particulate material having a hydrodynamic diameter of not greater than 0.3 $\mu$m in water is contained with an amount of at least 50% by weight and not more than 95% by weight to the total coated amount of the water-soluble polymer, the water-insoluble polymer, and the inorganic particulate material.

The water-soluble polymer desirably includes at least one compound selected from a group consisting of polyvinylalcohol, polyacrylamide, methylcellulose, polyvinylpyrrolidone, and gelatin. More desirably, the water-soluble polymer should include a polymerized product of a monomer selected from a group consisting of vinylalcohol, acrylamide, and vinylpyrrolidone.

The water-insoluble polymer desirably includes at least one polymerization product of a monomer selected from a group consisting of acryl, olefin, vinyl, urethane, and amide. Most desirably, the water-insoluble polymer should include at least one compound selected from a group consisting of acryl, urethane, polyolefin, and vinyl latex. The water-insoluble polymer can contain a polar functional radical. However, the degree should be lower than a level enough to form a water-soluble polymer.

It is desirable that the total amount of coating of the inorganic particulate material, the water-soluble polymer, and the water-insoluble polymer is at least 100 mg/m$^2$ or more. If the total coating amount is less than 100 mg/m$^2$, the adhesion ability between phase-transitioned ink and the receiving layer is lowered to a level which is practically inappropriate. Further, the coating efficiency is lowered at the coating amount less than 100 mg/m$^2$, and this is not desirable for the manufacturing cost of the recording medium. It is more desirable that the total amount of coating of the inorganic particulate material, the water-soluble polymer, and the water-insoluble polymer is at least 300 mg/m$^2$ or more.

In the case where an image is observed as a transmission image, it is desirable that the gloss of the surface of the recording medium is little, because it makes the image easy to observe. Further, it is desirable that the recording medium is colored, because an image which is easy to recognize can be obtained owing to the reduction of reflection. If the color is substantially blue, because blue is a receding color, this makes human eyes less fatigued and makes diagnosis psychologically easy; that is desirable. Further, if the transmission density of the colored transmission recording medium is not lower than 0.03 and not higher than 0.40, the reflection is reduced without lowering the transmitting ability, and an image to make a more correct diagnosis possible can be obtained; that is desirable.

On the other hand, in the case where an image is observed as a reflection image, it is desirable that the degree of gloss on the surface of the recording medium is high, because it makes the image easy to observe. It is desirable to suppress the coloring of the recording medium because coloring produces a possibility to make an image difficult to observe, and in the case where coloring is applied to the recording medium, particularly white color is desirable. Further, for a reflection image, it is desirable that the transmission density of the recording medium is 1.0 or lower.

As described in the above, because the characteristic required for a transmission image is contrary to that required for a reflection image, in the case where both a transmission image and a reflection image are used, it is desirable that the recording medium has a characteristic, which is intermediate for the both. Further, in the case where an image is observed through a high-luminance light box, even a strong coloring does not influence the diagnosis so much, but in the case where an image is observed as a reflection image by putting it on a white paper sheet or the like, the coloring gives a great influence to the ease of image observation. Therefore, it is desirable that the recording medium has a transparent supporting member, and the transmission density of the recording medium is 0.15 to 0.40; further, it is desirable to color the recording member into blue to a suitable degree.

{Ideal Reflection Vs. Transmission Density Characteristic}

Figure 5:
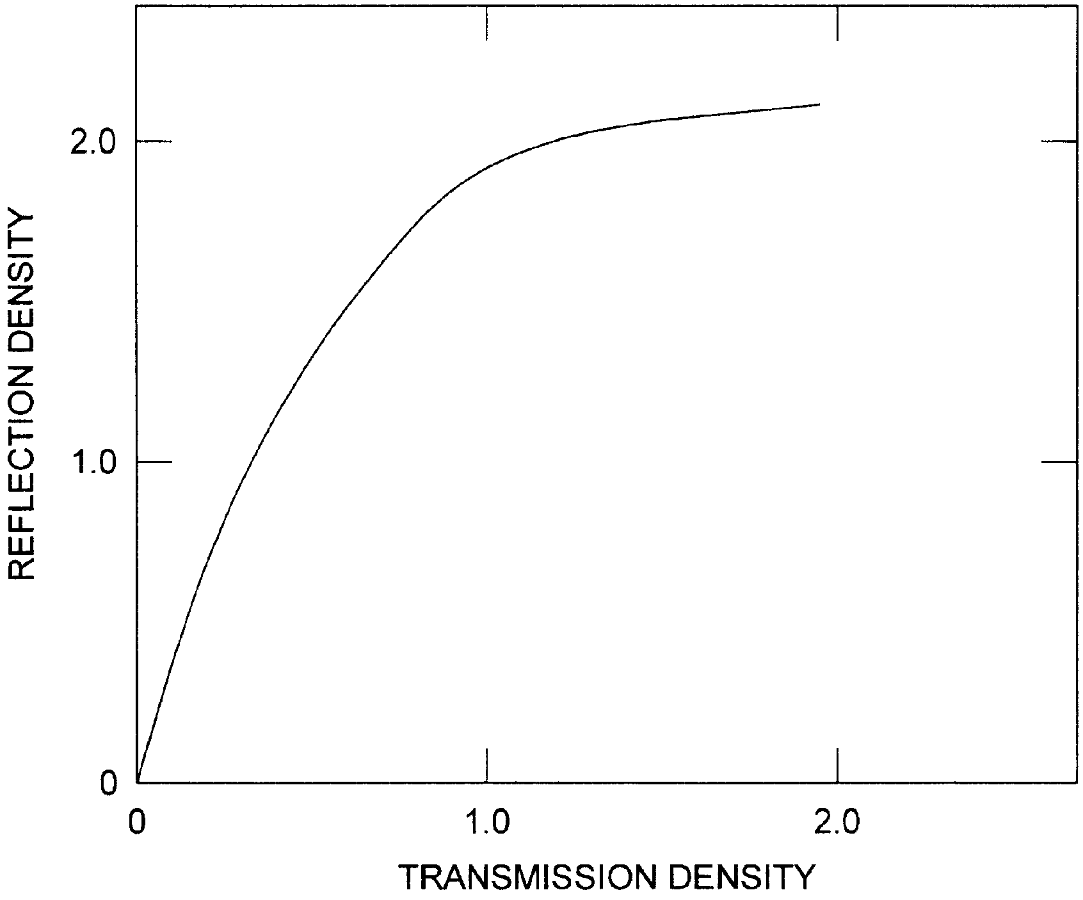
FIG. 5 is a graph showing a typical reflection density vs. transmission density characteristic.

FIG. 5 is a drawing showing a typical reflection density vs. transmission density characteristic. As described before, the detail is described in 'Yasushi Ohyama, "The relation between transmission density and reflection density of a photographic image layer", Journal of Japan Photographic Society, 41(1), pp. 42 to 59 (1978)'. If a reflection print is made on a transmission-type recording medium, the irradiation light passes through the transmission-type recording medium, then, it is reflected at the rear surface of the transmission-type recording medium, and it passes through the transmission-type recording medium again and comes out of the transmission-type recording medium. In this way, because the light passes through the transmission-type recording medium twice, it is expected that the reflection density is twice the transmission density.

However, in the low density region, the reflection density is more than twice the transmission density owing to the multiple reflection, then in the intermediate region, the gradient becomes approximately two, and in the high density region, the reflection density comes to saturation owing to the reflection light by the rear surface of the transmission-type recording medium.

FIGS. 6(*a*) to 6(*c*) are drawings showing reflection density gradation characteristics in an image recording apparatus for medical use which has a gradation characteristic designed for transmission density. FIG. 6(*a*) shows an example of a gradation characteristic of an image recording apparatus for medical use designed on the basis of transmission density, to show a case where the gradation characteristic is designed in such a way that the transmission density becomes linear to the signal value of image data. Then, in two recording systems respectively having different combinations of the image recording apparatus for medical use, the recording medium, and the ink, it is assumed that, in the case where both system are designed to have the same gradation characteristic shown in FIG. 6(*a*), they have the reflection density vs. signal value characteristics shown in FIG. 6(*b*) and FIG. 6(*c*) respectively. Let the system having the characteristic shown in FIG. 6(*b*) be referred to as recording system 1 and the system having the characteristic shown in FIG. 6(*c*) be referred to as recording system 2. To compare the both recording systems, it can be understood that the recording system 1 has a sharper gradient of reflection density in the low transmission density region than the recording system 2, and has a characteristic such that the reflection density tends to be saturated earlier. In other words, the recording system 2 has a characteristic curve having a shape more similar to the characteristic curve shown in FIG. 6(*a*) than the recording system 1; therefore, it is presumed that, when the both systems are observed as reflection images, it is the recording system 2 that is nearer to the transmission image in visual appearance.

On the other hand, when the reflection density vs. transmission density characteristics of the both systems are obtained, they are such ones as shown in FIG. 6(*d*) and FIG. 6(*e*) respectively.

According to the above, in order to obtain the visual consistency in the gradation characteristic when an image is observed as a transmission image or as a reflection image, it is desirable that the reflection density vs. transmission density characteristic has linearity in the whole density region. However, actually it is extremely difficult to make the reflection vs. transmission density characteristic strictly linear, and it is appropriate enough to make it have linearity to a certain extent.

For example, countermeasures such as (1) to ease the sharp gradient in the low density region, (2) to decrease the density saturation region at high luminance, and (3) to prevent at least the reversing of the density characteristic in the density region which is important for a diagnosis image can be considered. Besides, if the reflection vs. transmission density characteristic is finally linear, the transmission density vs. signal value characteristic and reflection density vs. signal value characteristic are similar, the transmission vs. signal value characteristic shown in FIG. 6(*a*) need not be linear, but may be designed to have any shape.

<Actual Situation of Reflection Vs. Transmission Density Characteristic>

Figure 7:
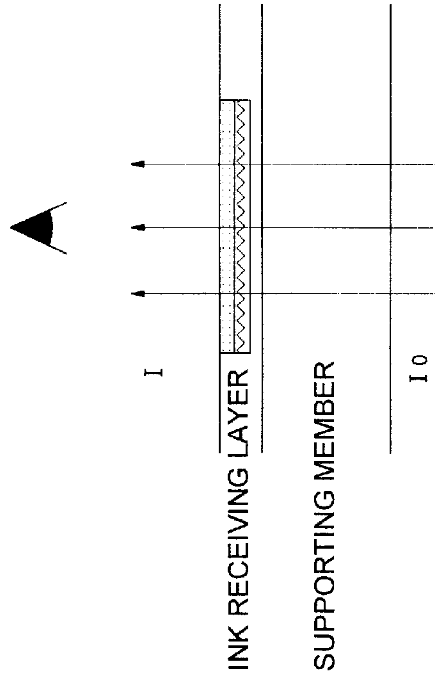
FIG. 7(*a*) to FIG. 7(*d*) are schematic drawings of density measurement for a recording medium with ink attaching on its image forming surface.
Figure 7:
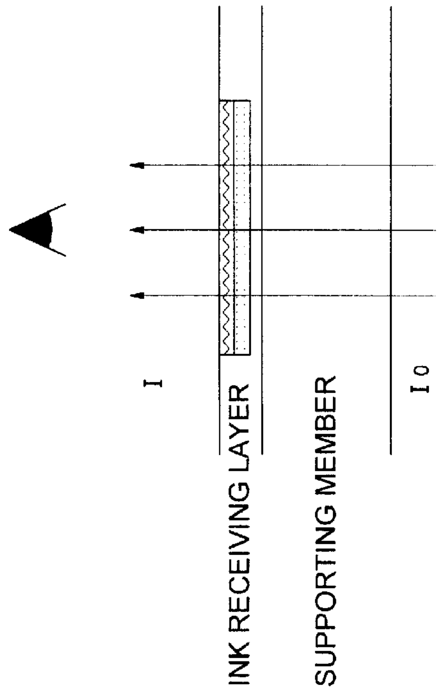
Figure 7:
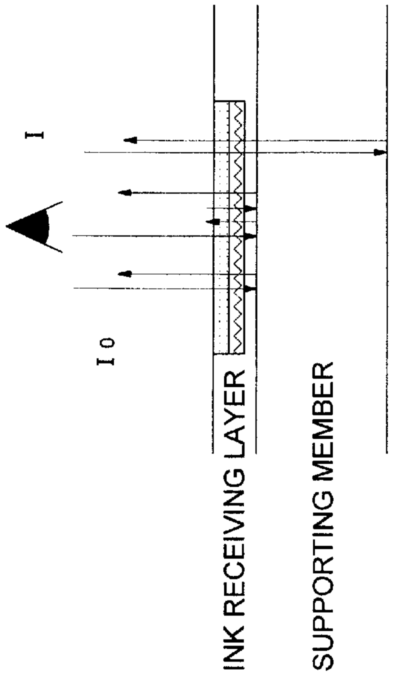
Figure 7:
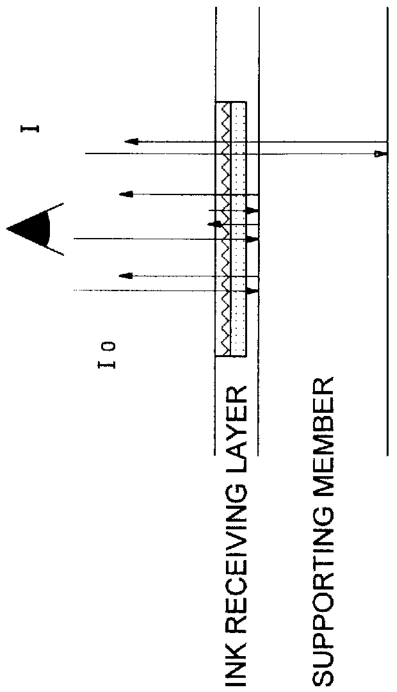

FIGS. 7(*a*) to 7(*d*) are schematic drawings of density measurement for a recording medium having ink attached to its image forming surface. FIG. 7(*a*) and FIG. 7(*b*) are schematic drawings of transmission density measurement. FIG. 7(*a*) corresponds to the case where a high-density ink drop is shot first and a low-density ink drop is shot later, and FIG. 7(*b*) corresponds to the case where a low-density ink drop is shot first and a high-density ink drop is shot later. When transmission density is measured, the light source is present at the side of the non-image-formation surface (under the recording medium in FIG. 7), and the light receiving device is present at the side of the image-formation surface (over the recording medium in FIG. 7). The irradiation light emitted towards the non-image-formation surface passes through the BC layer (backing layer) and the supporting member, comes out to the outside of the recording medium, and is detected by the light receiving device in the densitometer. Let $I_0$ be the irradiation light quantity emitted from the light source, and I be the received light quantity, then, the density Dt is expressed by the equation $Dt=-\log_{10}(I/I_0)$.

Next, FIG. 7(*c*) and FIG. 7(*d*) are schematic drawings of reflection density measurement. FIG. 7(*c*) corresponds to the case where a high-density ink drop is shot first and a low-density ink drop is shot later, and FIG. 7(*d*) corresponds to the case where a low-density ink drop is shot first and a high-density ink drop is shot later. When reflection density is measured, the light source and the light receiving device are both present at the side of the image-formation surface. The irradiation light emitted towards the image-formation surface passes through the image forming layer, then is reflected at the supporting member surface, and passes through the image forming layer again; after that, the light comes out to the outside of the recording medium and is detected by the light receiving device in the densitometer. Let $I_0$ be the irradiation light quantity emitted from the light source, and I be the received light quantity, then, the density Dr is expressed by the equation $Dr=-\log_{10}(I/I_0)$.

When the main factor to decrease the irradiation light quantity is light scattering by the dye or pigment in the image forming layer, in the case of reflection density, it is considered that principally the irradiation light having passed through the image forming layer twice is detected by the light receiving device, therefore the reflection density becomes, as shown in FIG. 5, twice the transmission density. However, in the low density region, the detected light quantity is further decreased by the multiple reflection produced in the image forming layer, which makes the reflection density greater than twice the transmission density. With the increase of the density, the influence of the multiple reflection becomes smaller, and the gradient decreases gradually, and approaches to 2; in the high density region, because only the reflection light from the recording medium surface is detected, the reflection density becomes saturated. This tendency in reflection vs. transmission density characteristic is as shown in FIG. 5.

It will be explained the cause of the reflection density becoming different even in the case of the same number of ink drops combined with the same kind of ink density. The cases where the order of driving a high-density ink drop and a low-density ink drop into the ink receiving layer is changed will be shown. FIG. 7(*a*) and FIG. 7(*c*) show an image formed by jetting ink drops in the order of high-density ink to low-density ink, and FIG. 7(*b*) and FIG. 7(*d*) show an image formed by jetting ink drops in the order of low-density ink to high-density ink. In the case of transmission density, it is confirmed that density does not depend on the order of the ink jetting. In other words, FIG. 7(*a*) and FIG. 7(*b*), which are jetted inks in different order from each other, seem to be similar densities when the transmission image is observed. It is presumed to result from that the light-transmission rate of the image depends on the amount of the dye adhered on the recording medium per unit area, and does not depend on the distribution of the density in the direction of depth of the recording medium. However, in the case of reflection density, it is confirmed that density depends on the order of the ink jetting. In other words, when the reflection image is observed, the reflection density of FIG. 7(*d*) is seem to be larger than that of FIG. 7(*c*). However, the reason of this phenomenon is not known exactly, however, it is presumed to result from the following reason. A light entering the recording medium is reflected, scattered and absorbed in the recording medium, and the reflected light and the scattered light are released to out of the recording medium. The ingredients in the recording medium cause the reflection, scattering and absorbing of the light, however, the dye absorbs the light, mainly. Therefore, the nearer the surface of the recording medium the dye is, the smaller the ratio of the reflection light reflected by the ingredients and released as the released light becomes. In similar fashion, the farther from the surface of the recording medium the dye is, the greater the ratio of that becomes. Thus, when the dye exists at neighborhood of the surface, the reflection light decreases at the neighborhood of the surface and then the released light also decreases. As the result of that, the reflection density becomes large. In contrast, when the dye exist in relatively deep position, the reflection light at the neighborhood of the surface does not decrease so much, and then the released light does not decrease similarly. As the result of that, the reflection density becomes small. In this manner, the amount of the released light is variable in accordance with the position of the dye, even if the total amount of the dye is equal, and then the reflection density is also variable like FIG. 7(*c*) and FIG. 7(*d*).

<Arrangement of Ink Drops and Density Reversing Phenomenon>

Figure 8:
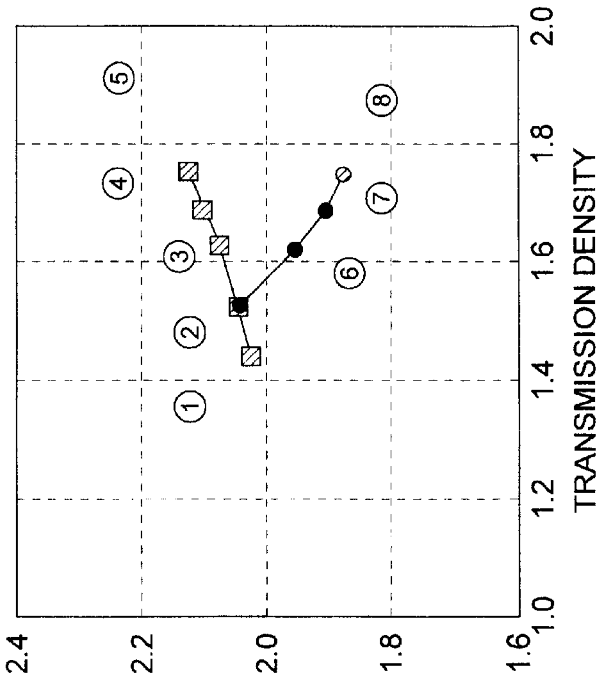
FIG. 8(*a*) to FIG. 8(*c*) are drawings showing the result of density measurement of a uniform-density image produced by using a recording apparatus of an ink jet method.

FIGS. 8(*a*) to 8(*c*) are drawings showing the result of the measurement of the density of a uniform-density image produced by using an ink-jet-type recording apparatus. It is investigated the density characteristic in cases where the density and the number of drops of the ink shot into each of the cells of the dither matrix shown in FIG. 8(*a*) are changed. Uniform-density images at densities corresponding to the eight dither matrices from ① to ⑧ in FIG. 8(*b*) (3 to 7 drops per matrix) are produced, and their transmission density and reflection density are measured. Besides, a high-density ink drop is represented by ●, and a low-density ink drop is represented by ○. The details of ink drops shot into the cells LU (upper left), RU (upper right), LL (lower left), and RL (lower right) are shown in FIG. 8(*b*). For example, ○● means that a low-density ink drop ○ is first shot, and then a high-density ink drop ● is shot to the same position, and on the contrary, ●○ means that a high-density ink drop is first shot, and then a low-density ink drop is shot to the same position. To observe them by each matrix, the matrix ① is composed of three drops of ●, and for the matrices from ② to ⑤, one drop of ○ is added one by one to the former matrix; these cases correspond to those where a low-density ink drop ○ is always shot first. On the other hand, for the matrices ⑥ to ⑧, one drop of ○ is added one by one to the former matrix in the same way as the above, but these cases correspond to those where a high-density ink drop ● is always shot first.

FIG. 8(*c*) shows the measured values of the reflection vs. transmission density characteristics. It was confirmed that, for the matrices ①②③④⑤, the transmission density increases with the increase of the total number of ink drops driven into the matrix, that is, with the increase of the total quantity of the dye, while for the matrices ①②⑥⑦⑧, the transmission density increases with the total number of ink drops, but for the matrices ⑥ to ⑧, the reflection density decreases with the total number of ink drops. If this phenomenon is positively utilized, by changing the order of the jetting of ink drops, it is possible to control reflection density only with transmission density kept constant.

<Positional Relationship of Recording Head>

Figure 9:
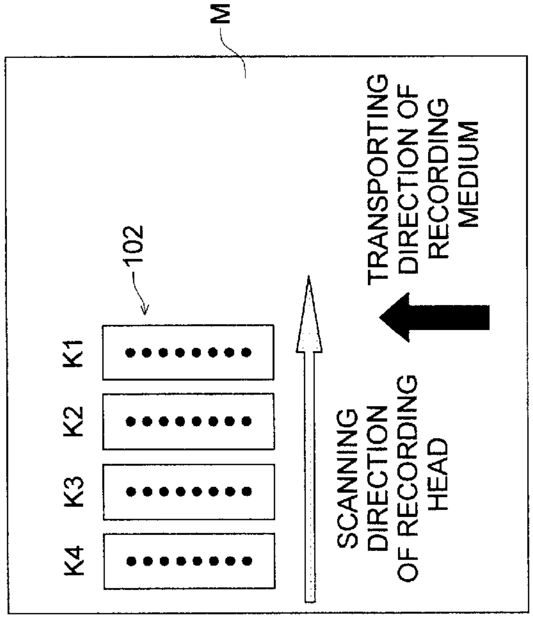
FIG. 9(*a*) to FIG. 9(*g*) are schematic drawings of ink jetting.
Figure 9:
Figure 9:
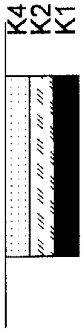
Figure 9:
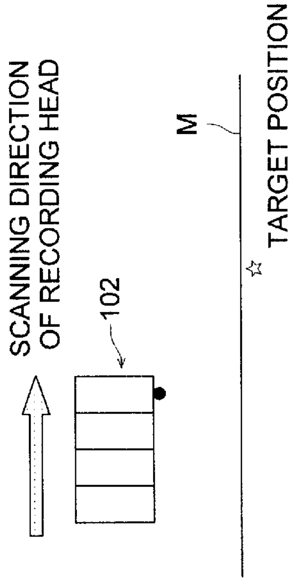
Figure 9:
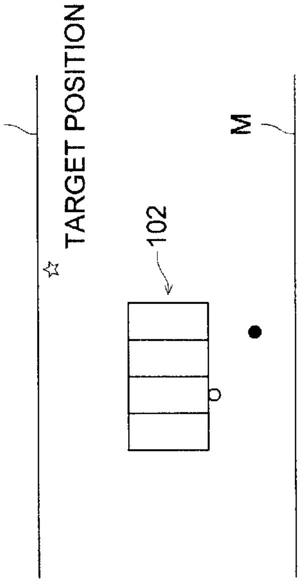
Figure 9:
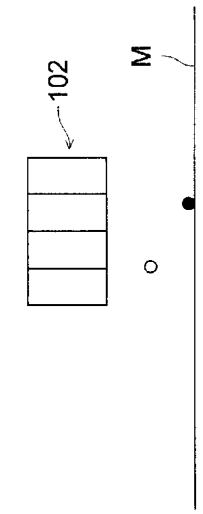
Figure 9:
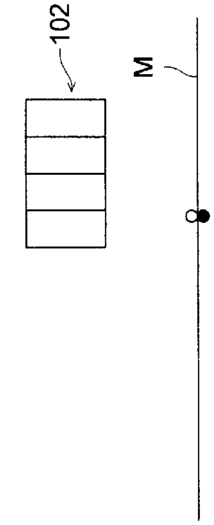

FIG. 9(*a*) to FIG. 9(*d*) are schematic drawings showing the case where two drops of ink having different densities respectively are jetted to the approximately same position within the one and the same scan by using recording heads respectively having different-density inks. Because the heads are driven at a constant speed, an ink drop of ink K1 is jetted from the recording head 102 of K1 at a position a little before the target position (FIG. 9(*a*)). Next, when the recording head 102 of K3 reaches the position where the recording head 102 of K1 jetted an ink drop of ink K1, an ink drop of ink K3 is jetted from the recording head 102 of K3 (FIG. 9(*b*)). The ink drop of ink K1, which has been first jetted, lands on the surface of the recording medium (FIG. 9(C)), and immediately after that, the ink drop of ink K3 lands approximately at the same position (FIG. 9(*d*)).

FIG. 9(*e*) is a drawing showing a recording head unit having such an arrangement as to jet a higher-density ink drop earlier and a lower-density ink drop later. In an image recording apparatus for medical use having the recording heads 102, recording heads are arranged approximately parallel in the order of higher to lower density from the right-hand side in the drawing, that is, in the order of K1, K2, K3, and K4 from right to left. For example, in the case where the recording heads are repeatedly driven forth and back in the direction approximately perpendicular to the direction of the transporting of the recording head, and ink drops are made to attach to the recording medium M during either forth or back moving, the order of ink drop landing is always definite (FIG. 9(*f*) and FIG. 9(*g*)). To state it concretely, at the time of scanning when ink jetting is carried out, an ink drop jetted from a recording head located at the upstream side in the arrays of recording heads 102 with respect to the scanning direction is always landed earlier, and an ink drop jetted from another one located at the downstream side in the array is landed later.

If it is used such a method as to make recording by using a combination of plural recording heads or such one as to make recording by jetting ink drops a plurality of times to one and the same cell with increased number of nozzles, it is actually possible to change arbitrarily the order of the jetting of ink drops. However, this is not desirable because it produces a problem that the apparatus becomes larger-sized, control becomes troublesome, or recording time becomes longer.

In this way, by arranging the recording heads in such a way as to shoot a high-density ink drop first and to shoot a low-density ink drop last, it is possible to make smaller the gradient of the reflection vs. transmission density characteristic curve in the low to medium density region by suppressing reflection density with the transmission density kept constant.

<Resolution>

Figure 10:
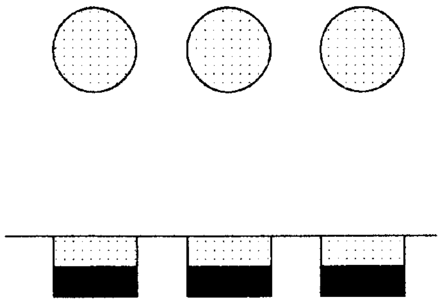
FIG. 10(*a*) to FIG. 10(*d*) are schematic drawings in the case where ink drops are shot approximately at the same position repeatedly.
Figure 10:
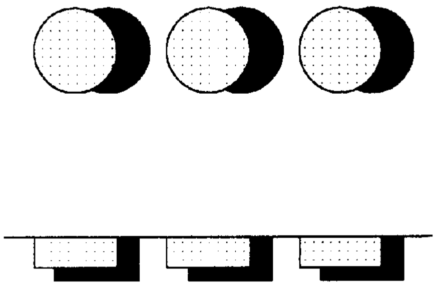
Figure 10:
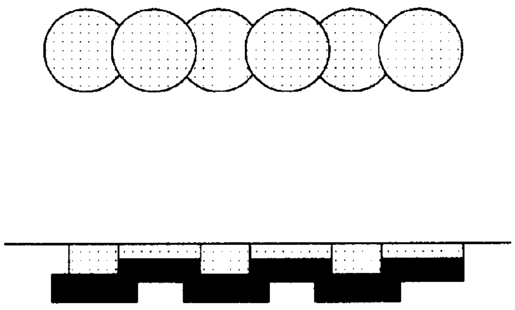
Figure 10:
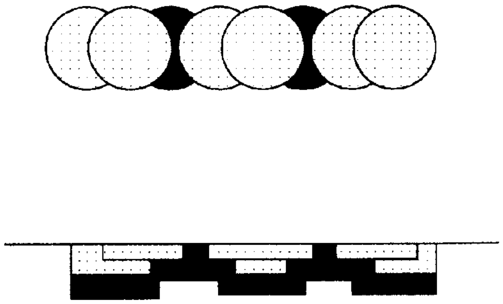

FIGS. 10(*a*) to 10(*d*) are schematic drawings for the case where ink drops are repeatedly shot approximately to the same position. FIG. 10(*a*) and FIG. 10(*b*) represent the case of low resolution, and FIG. 10(*c*) and FIG. 10(*d*) represent the case of high resolution. FIG. 10(*a*) and FIG. 10(*c*) represent the case where the precision of recording of the ink jet recording apparatus is good, and a high-density ink area is completely covered with the low-density ink if their landing positions coincides with each other perfectly. However, FIG. 10(*b*) shows the case of low resolution where the recording positions of high-density ink drop are a little deviated owing to the poor recording precision; the high-density ink areas are not completely covered with low-density ink. Therefore, the fluctuation of reflection density due to the fluctuation of landing position tends to occur. On the other hand, in the case of high resolution (FIG. 10(*d*)), the fluctuation of reflection density due to the fluctuation of landing position is reduced.

As described in the above, in order to reduce the fluctuation of the reflection density, it is desirable to make the recording apparatus for medical use have a high resolution. Further, because the clearance between dots makes the granularity worse, it is desirable that the apparatus has a high resolution for the purpose of covering out the clearance too. In order to improve the capability of an image for medical use in diagnosis, a resolution not lower than 360 dpi (dpi=dots per inch, the number of dots per 25.4 mm), that is, a recording density not more than that corresponding to a dot size of 70 $\mu$m.

<Improvement of Reflection Vs. Transmission Density Characteristic>

Figure 11:
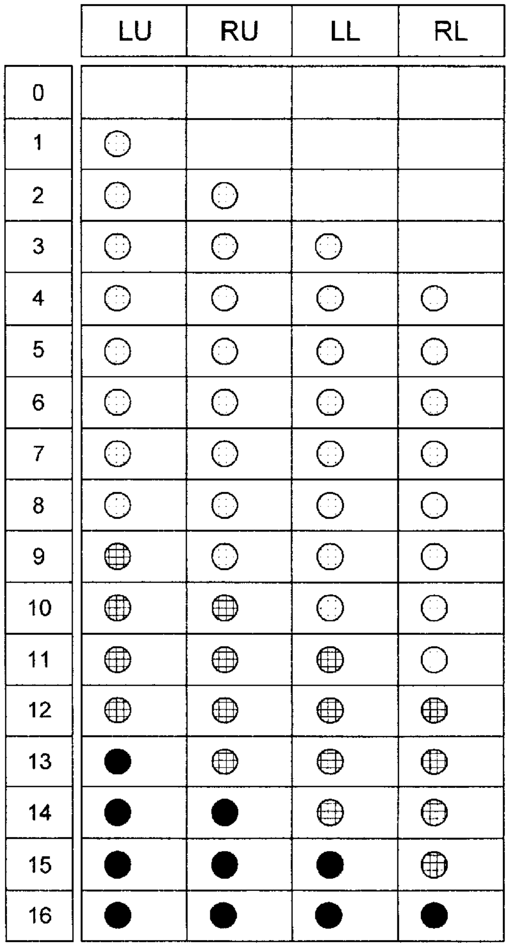
FIG. 11(*a*) and FIG. 11(*b*) are drawings showing the production of gradation.
Figure 11:
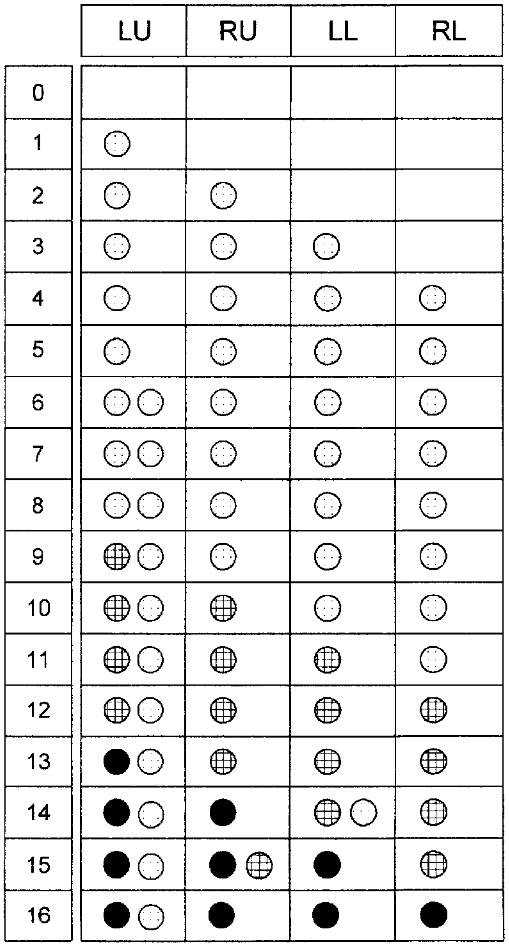

FIGS. 11(*a*) and (*b*) are tables of 17 gray levels produced actually by using four kinds of K ink having different densities respectively. FIG. 11(*a*) is a table in the case of one ink drop per cell at the maximum, and FIG. 11(*b*) is a table in the case of two ink drops per cell at the maximum. ○ represents an ink drop, and the density of ○ corresponds to the density of ink in the same order; that is, ● corresponds to the highest-density ink and ○ corresponds to the lowest-density ink. The definitions of LU to RL and the order of the *o are the same as those in FIGS. 8(*a*) and 8(*b*).

Figure 12:
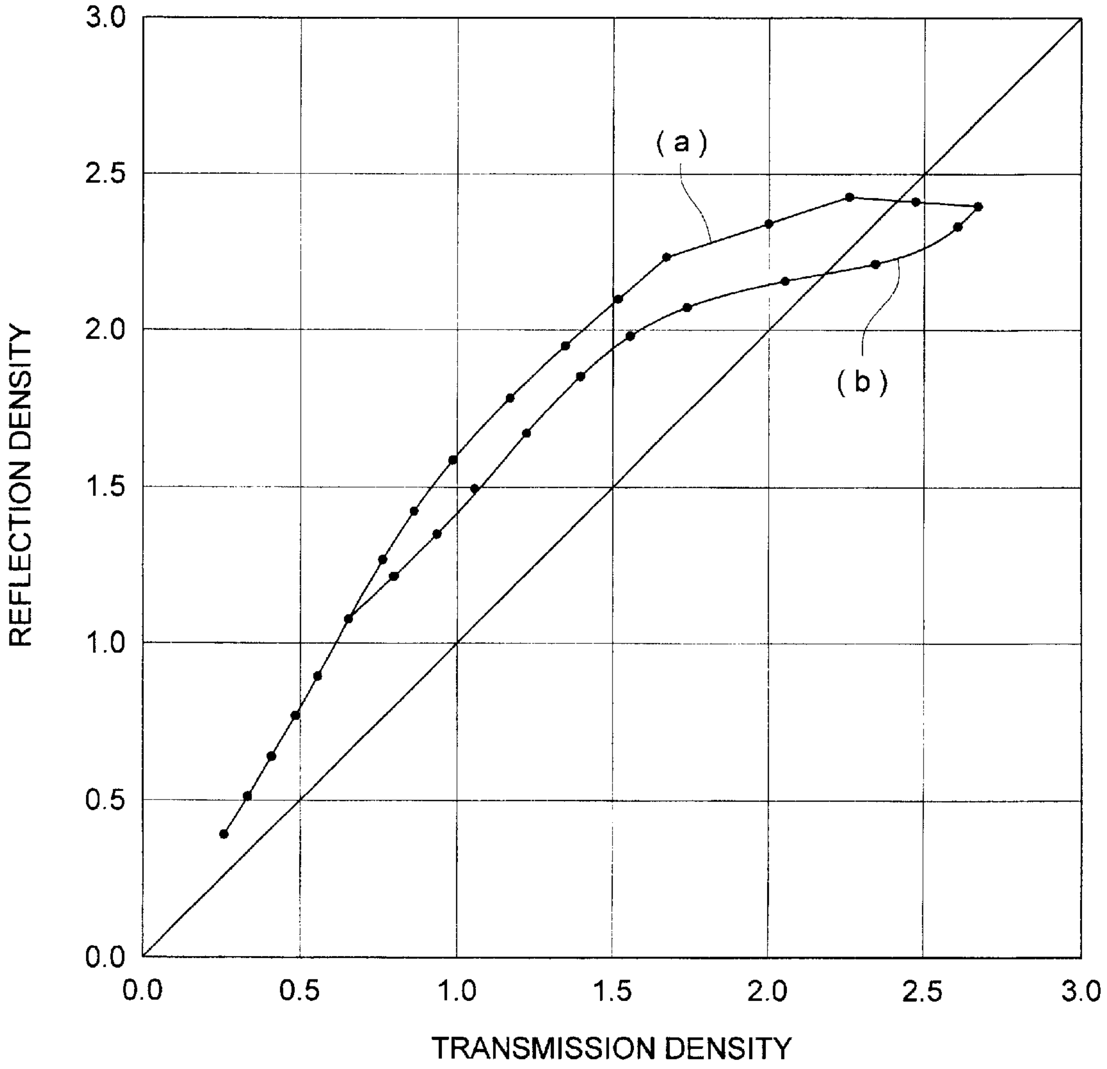
FIG. 12 is a drawing showing the comparison of gradation characteristics.

FIG. 12 shows a reflection density vs. transmission density characteristics obtained by actual measurements. Each of (*a*) and (*b*) in FIG. 12 corresponds to FIG. 11(*a*) and FIG. 11(*b*), respectively. As shown in this graph, it was confirmed that when a gradation was produced by shooting a low-density ink drop to a cell again to which a high-density ink drop had been shot, a gradation having a suppressed gradient could be obtained.

Further, in the case where the gradation in the low density region shall be gentle, it is used a method in which four kinds of low-density ink for lowering density or a clear ink is prepared. It is desirable that a control to make the number of ink drops constant is practiced, four to eight kinds of ink having the same hue are combined, and an ink drop having such an extremely low density as to hardly influence the image density or a clear ink drop containing no dye at all is shot last, because it makes the control of gradation easy. Further, if ink jetting using such low density inks is made evenly all over the image, it is possible to suppress the reflection density totally. In order to use the amount of ink absorption by the recording medium effectively, it is desirable to make the amount of ink drops per unit area uniformly constant.

EXAMPLES

In the following, this invention will be explained in more detail on the basis of examples of practice, but this invention should not be limited to these examples. Preparation of ink and recording medium, production of test patterns, and their evaluation are practiced in the following way.

[Preparation of Ink]

Dye ink having a substantially black color was prepared in the following way. Hereinafter, "% by weight" will be sometimes noted as "part".

| | |
|---|---|
| diethyleneglycol | 20 part |
| dye | 5 part |
| EMULGEN 913 (by Kao Corporation) | 0.2 part |
| PROXEL GXL (by ICI Americas Inc.) | 0.015 part |
| pure water | 75 part |

As regards the black dye, black dye Direct Black 19, blue dye Direct Blue 99, and yellow dye Direct Yellow 86 were suitably mixed to make black dyes having different black color contents, and dye inks 1 to 4 were prepared.

[Preparation of Recording Medium]

[Support]

Polyethyleneterephthalate film base having a thickness of 105 μm or 175 μm was used. Further, 4 kinds of film, namely, non-colored (hereinafter referred to as T), blue-colored—a little (hereinafter referred to as B1), blue-colored—medium (hereinafter referred to as B2), and blue-colored—much (hereinafter referred to as B3) were prepared.

[Image Forming Layer]

First subbing layer and second subbing layer described below were provided on one side of polyethyleneterephthalate film base (side A), and a backing layer was provided on the other side (side B); this was heat-treated at 140° C. for 2 minutes.

| Side A | | |
|---|---|---|
| (first layer) | | |
| polymer latex 1 | (solid content) | 40 mg//m$^2$ |
| polymer latex 2 | (solid content) | 760 mg//m$^2$ |
| water-soluble polymer | | 40 mg//m$^2$ |
| surfactant | | 16 mg//m$^2$ |
| (second layer) | | |
| polymer latex 3 | (solid content) | 300 mg//m$^2$ |
| water-soluble polymer | | 15 mg//m$^2$ |
| SP-15 | | 600 mg//m$^2$ |
| bridging agent 1 | | 100 mg//m$^2$ |
| surfactant 2 | | 7 mg//m$^2$ |
| silica fine particles | | 1 mg//m$^2$ |

Polymer latex 1: polymer latex produced by the copolymerization of styrene, glycidylmethacrylate, and n-butylacrylate (20, 40, and 40% by weight).

Polymer latex 2: polymer latex produced by the copolymerization of styrene, glycygilmethacrylate, n-butylacrylate, and acetoacetoxyethylmethacrylate (35, 40, 5, and 20% by weight).

Polymer latex 3: polymer latex produced by the copolymerization of styrene, glycygilmethacrylate, and n-butylacrylate (40, 40, and 20% by weight).

Water-soluble polymer 1: copolymer of sodium isoprene sulfonate and styrene.

Surfactant 1:

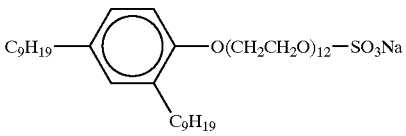

Surfactant 2:

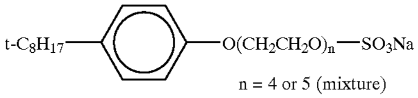

n = 4 or 5 (mixture)

| Side B | |
|---|---|
| polymer latex 4 | 300 mg//m$^2$ |
| water-soluble polymer 1 | 25 mg//m$^2$ |
| hydrophilic polyester | 2000 mg//m$^2$ |
| polymethylmethacrylate fine particles (average particle diameter 10 μm) | 120 mg//m$^2$ |
| surfactant 3 | 5 mg//m$^2$ |

Polymer latex 4: polymer latex produced by copolymerization of styrene, glycidylmethacrylate, n-butylacrylate, and acetoacetoxyethylmethacrylate (40, 30, 10, and 20% by weight).

Hydrophilic polyester: polyester produced by condensation polymerization of dimethyl terephthalate, dimethyl isophthalate, dimethyl 5-sodiumsulfoisophthalate, and 1,4-cyclohexyldicarboxylic acid as dicarboxylic acid constituents and ethylene glycol as a diol constituent.

Surfactant 3:

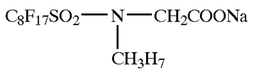

Next, the side A was coated with coating liquid for the image receiving layer by a slide hopper; the film was dried after setting, and the coloring agent receiving layers described below were provided.

| | |
|---|---|
| First and second layers | |
| polymer latex | 36 g//m$^2$ |
| hydrophilic binder (gelatin) | 4 g//m$^2$ |
| bridging agent 2 | 90 mg//m$^2$ |
| Third layer | |
| polymer latex | 36 g//m$^2$ |
| hydrophilic binder (gelatin) | 4 g//m$^2$ |
| bridging agent 2 | 90 mg//m$^2$ |
| polymethylmethacrylate fine particles having average particle diameter of 15 μm | 200 mg//m$^2$ |
| surfactant 3 | 8 mg//m$^2$ |
| surfactant 4 | 8 mg//m$^2$ |

Bridging agent 2:
$CH_2{=}CH{-}SO_2CH_2CONHCH_2CH_2NHCOCH_2SO_2CH{=}CH_2$
Surfactant 4:

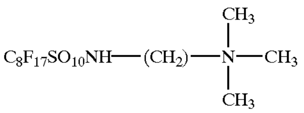

As described in the above, recording media for ink jet recording having an image forming layer (samples 1 to 8) were prepared.

[Production of Test Patterns]

Test pattern images were produced by using an ink jet recording apparatus manufactured by Konica Corp. For each of the samples 1 to 8, a sheet of "Test Pattern 1", and two sheets of "Test Pattern 2" for reference (for a transmission image) and for evaluation (for a reflection image) respectively, that is, total 3 sheets for each were produced. Besides, as regards the density gradation, the above-mentioned 4 kinds of ink having different densities respectively were used, and 17 gray level tables in FIG. 11(*a*) and FIG. 11(*b*) were used. The resolution of the ink jet recording apparatus was 1440 dpix1440 dpi.

[Test Pattern 1]

For each of Recording materials 1 to 8, Gray scale images having 17 grades corresponding to the 17 gray scale tables in FIG. 11(*a*) and FIG. 11(*b*) were produced (each of the gray scale image is referred to as Density patch). Incidentally, each of the Density patches was an image having uniform density constructed by only one density level of 0 to 16 density levels in FIG. 11(*a*) or FIG. 11(*b*), and each of the Density patches was named as No. 0 to No. 16, respectively, in accordance with the above-mentioned density level. The size of the Density patch was 20 mm square, and the density of the patch could be measured, sufficiently.

[Test Pattern 2]

By using an X-ray image radiographing apparatus Regius 330 (manufactured by Konica Corp.), a chest part was radiographed, and images for diagnosis were produced on the basis of the image data obtained.

[Numbers of the Samples]

Sample 1-a means that Teat Patterns 1 and 2 were prepared by utilizing Recording Medium 1 and the density gradation according to FIG. 11(*a*). Other Samples were named in the similar manner to the Sample 1-a. Each of the Samples was detailed in following Table 1.

"VD" and "BD" are, respectively, a visual density and a blue density of the transmission density of the recording medium, and VD and BD were measured according to the definition detailed above. For the measurement of VD and BD, a PDM-65 densitometer (manufactured by Konica Corp.) was used, and each of VD and BD was measured with an umber filter and a blue filter, respectively. BD/VD is a measure for evaluating the degree of blueness of a recording medium; when BD/VD is near to 1, degree of transparency is high, and the smaller it is, it corresponds to more bluish color.

TABLE 1

| | Recording Medium | | | | | |
|---|---|---|---|---|---|---|
| Sample Nos. | Nos. of the recording medium | Support | Thickness of the support (μm) | Transmission density (VD) | BD/VD | Applied Density Gradation |
| 1-a | 1 | T | 105 | 0.05 | 1.00 | Fig. 11(a) |
| 1-b | 1 | T | 105 | 0.05 | 1.00 | Fig. 11(b) |
| 2-a | 2 | T | 175 | 0.08 | 1.00 | Fig. 11(a) |
| 2-b | 2 | T | 175 | 0.08 | 1.00 | Fig. 11(b) |
| 3-a | 3 | B1 | 105 | 0.17 | 0.67 | Fig. 11(a) |
| 3-b | 3 | B1 | 105 | 0.17 | 0.67 | Fig. 11(b) |
| 4-a | 4 | B1 | 175 | 0.21 | 0.45 | Fig. 11(a) |
| 4-b | 4 | B1 | 175 | 0.21 | 0.45 | Fig. 11(b) |
| 5-a | 5 | B2 | 105 | 0.24 | 0.53 | Fig. 11(a) |
| 5-b | 5 | B2 | 105 | 0.24 | 0.53 | Fig. 11(b) |
| 6-a | 6 | B2 | 175 | 0.29 | 0.34 | Fig. 11(a) |
| 6-b | 6 | B2 | 175 | 0.29 | 0.34 | Fig. 11(b) |
| 7-a | 7 | B3 | 105 | 0.33 | 0.25 | Fig. 11(a) |
| 7-b | 7 | B3 | 105 | 0.33 | 0.25 | Fig. 11(b) |
| 8-a | 8 | B3 | 175 | 0.38 | 0.14 | Fig. 11(a) |
| 8-b | 8 | B3 | 175 | 0.38 | 0.14 | Fig. 11(b) |

[Condition for Evaluation]

For the measurement of the transmission density and the reflection density in this example of practice, PDM-65 densitometer (manufactured by Konica Corp.) was used. When the reflection density was measured, a sheet of Photolike QP (manufactured by Konica Corp.) a glossy paper for ink jet recording) was used as an underlay of a sample, and the reflection density (VD) of this glossy paper was 0.08.

[Condition for Observation of Transmission Image]

Above-obtained Test Patterns 1 and 2 of the each of the Samples were placed on a light box (the illumination intensity of the light box was about 10000 lx at a surface of diffusing plate), and observed as transmission images. Incidentally, when the images were observed, the light was put out so as to make the illumination in the room not more than 30 lx.

[Condition for Observation of Reflection Image]

Above-obtained Test Patterns 1 and 2 of the each of the Samples were placed on the floor in the room (the illumination intensity in the room was about 500 lx), and observed as reflection images. When the reflection images were observed, a sheet of Photolike QP (manufactured by Konica Corp.) a glossy paper for ink jet recording) was placed between the sample and the floor as an underlay of a sample.

[Judging Persons]

3 persons skilled in the art visually observed the obtained images, and the results evaluated by them were averaged.

[Evaluation 1]

[Smoothness of Gradation]

The following Table 2 shows the relation between the reflection vs. transmission density characteristic and Smoothness of Gradation of the image. Test Pattern 1 of each of the Samples was used in this evaluation. “Monotone non-decreasing” in Table 2 represents the measuring results of the behavior of the reflective densities in the reflection vs. transmission density characteristic curve regarding the 17 degrees of the density patches of each of the Test Patterns recorded on the recording mediums. More specifically, it represents whether the reflection densities of the density patches were “monotone non-decreasing” or not in the range when the transmission densities of the density patches were “monotone non-decreasing” in the density range of 0 to 2.0. “YES” in Table 2 means that when the transmission densities Dt of the density patches satisfied the relation of $Dt(i+1)>Dt(i)$ ($i=0, 1, \ldots, 16$), the reflection densities Dr always satisfies the relation of $Dr(i+1)\geqq Dr(i)$ ($i=0, 1, \ldots 16$): i represents each of the numbers of the density patches. “NO” means the case other than “YES”. “Monotone non-decreasing” in Tables 3 to 6 represents the same as in Table 2.

“Smoothness of Gradation of images” in Table 2 represents the visually observed results regarding smoothness of gradation, when the density patches of 17 degrees, which were recorded on the recording mediums, were observed as the reflection image. The observed results were classed as follows.

A: The image was extremely smooth

B: The image was smooth

C: The image was partially rough

D: The image was rough wholly

The results are shown in following Table 2.

TABLE 2

| Sample Nos. | Monotone non-decreasing | Smoothness of Gradation | Remarks |
|---|---|---|---|
| 1-a | NO | D | Comparative |
| 1-b | YES | B | Inventive |
| 2-a | NO | D | Comparative |
| 2-b | YES | B | Inventive |
| 3-a | NO | D | Comparative |
| 3-b | YES | A | Inventive |
| 4-a | NO | D | Comparative |
| 4-b | YES | A | Inventive |
| 5-a | NO | D | Comparative |
| 5-b | YES | A | Inventive |
| 6-a | NO | D | Comparative |
| 6-b | YES | A | Inventive |
| 7-a | NO | D | Comparative |
| 7-b | YES | A | Inventive |
| 8-a | NO | D | Comparative |
| 8-b | YES | A | Inventive |

As is apparent from Table 2, the images, which were recorded to make the reflection density being “Monotone non-decreasing” in the range of the transmission density being 0 to 2.0, showed excellent result in Smoothness of Gradation.

[Evaluation 2]

[Consistency of Gradation]

The following Table 3 shows the relation between VD of the transmission image and Consistency of Gradations of the transmission image and the reflection image. Test Pattern 1 of each of the Samples was used in this evaluation. “Consistency of Gradation” means the consistency between the density gradation characteristics of the transmission image and that of the reflection image when the 17 degrees of density patches of each of the Test Patterns recorded on the recording medium were visually observed as both of the transmission image and the reflection image and were compared each other. The observed results were classed as follows.

A: Gradations of both of the images extremely consisted with each other.

B: Gradations of both of the images consisted with each other.

C: Gradations of both of the images partially differed from each other.

D: Gradations of both of the images differed wholly from each other.

E: Gradations of both of the image differed extremely and wholly from each other.

The results are shown in following Table 3.

TABLE 3

| Sample Nos. | Monotone non-decreasing | VD | Consistency of Gradation | Remarks |
|---|---|---|---|---|
| 1-a | NO | 0.05 | E | Comparative |
| 2-a | NO | 0.08 | E | Comparative |
| 3-a | NO | 0.17 | E | Comparative |
| 5-a | NO | 0.24 | E | Comparative |
| 7-a | NO | 0.33 | E | Comparative |
| 8-a | NO | 0.38 | E | Comparative |
| 1-b | YES | 0.05 | D | Inventive |
| 2-b | YES | 0.08 | C | Inventive |
| 3-b | YES | 0.17 | B | Inventive |
| 5-b | YES | 0.24 | A | Inventive |
| 7-b | YES | 0.33 | A | Inventive |
| 8-b | YES | 0.38 | B | Inventive |

As is apparent from Table 3, the images, which were recorded on the recording medium satisfying $VD>0.08$, and were recorded to make the reflection density being “Monotone non-decreasing” in the range of the transmission density being 0 to 2.0, showed excellent result in Consistency of Gradations of the transmission image and the reflection image. As the results of more specific experiments, it was found that the Consistency of Gradation was further improved when recording materials having VD of 0.15 to 0.4.

[Evaluation 3]

[Color Tone of Reflection Image]

The following Table 4 shows the relation between BD/VD and Color Tone of the reflection image. Test Pattern 1 of each of the Samples was used in this evaluation. “Color Tone of the reflection image” was evaluated by visually observing the reflection image of the Test Pattern 2 of each of Samples. The evaluated results were classed as follows.

A: The image showed extremely excellent color tone.

B: The image showed good color tone.

C: The color tone of the image was poor bad was acceptable.

D: The image showed bad color tone.

The evaluated results are shown in following Table 4.

TABLE 4

| Sample Nos. | Monotone non-decreasing | VD | BD/VD | Color Tone of reflection image | Remarks |
|---|---|---|---|---|---|
| 3-a | NO | 0.17 | 0.67 | D | Comparative |
| 4-a | NO | 0.21 | 0.45 | D | Comparative |
| 5-a | NO | 0.24 | 0.53 | D | Comparative |
| 6-a | NO | 0.29 | 0.34 | D | Comparative |
| 7-a | NO | 0.33 | 0.25 | D | Comparative |

TABLE 4-continued

| Sample Nos. | Monotone non-decreasing | VD | BD/VD | Color Tone of reflection image | Remarks |
|---|---|---|---|---|---|
| 8-a | NO | 0.38 | 0.14 | D | Comparative |
| 3-b | YES | 0.17 | 0.67 | A | Inventive |
| 4-b | YES | 0.21 | 0.45 | A | Inventive |
| 5-b | YES | 0.24 | 0.53 | A | Inventive |
| 6-b | YES | 0.29 | 0.34 | A | Inventive |
| 7-b | YES | 0.33 | 0.25 | B | Inventive |
| 8-b | YES | 0.38 | 0.14 | C | Inventive |

As is shown in above Table 4, the images, which were recorded on the recording medium satisfying $BD/VD \geqq 0.25$ as well as $VD > 0.15$, and were recorded to make the reflection density being "Monotone non-decreasing" in the range of the transmission density being 0 to 2.0, showed excellent result in Color Tone of the reflection image. As the results of more specific experiments, it was found that the Color Tone of the reflection image was further improved when recording materials satisfying the relations of $BD/VD \geqq 0.25$ and $0.15 \times VD \leqq 0.4$.

[Evaluation 4]

[Consistency of Gradation and Image Quality]

The following Table 5 shows the relation between the Density Difference and Consistency of Gradations of the transmission image and the reflection image as well as Image Quality. Density Difference ΔD represents the difference between the transmission density and the reflection density of each of the 17 degrees of the density patches of each of Samples. More specifically, the transmission density Dt(i) (i=1, 2, . . . , 16) and the reflection density Dr(i) (i=1,2, . . . , 16) were measured (i is the number of each of the density patch), and difference of each of the density patches $\Delta D = |Dr(i) - Dt(i)|$ was calculated. "YES" of "ΔD<1.0?" in Table 5 means that all of the density patches satisfied the relation $\Delta D < 1.0$, in the range of the transmission density being 2.0 or less. "No" represents the case other than "YES". "YES" of "ΔD<0.7?" in Table 5 means that all of the density patches satisfied the relation $\Delta D < 0.7$, in the range of the transmission density being 2.0 or less. "No" represents the case other than "YES". These in Table 7 represent the same as in Table 5.

For the evaluation of "Consistency of Gradation", Test Pattern 2 of each of Samples was utilized. "Consistency of Gradation" means the consistency between the density gradation characteristics of the transmission image and that of the reflection image when Test Pattern 2 of each of Samples was visually observed as both of the transmission image and the reflection image and were compared each other. The observed results were classed as follows.

A: The consistency of both images was excellent

B: The consistency of both images was slightly poor but was acceptable

C: The consistency of both images was poor

For the evaluation of Image Quality, Test Pattern 2 of each of Samples was utilized. "Image Quality" was evaluated by visually observing Test Pattern 2 of each of Samples as a reflection image.

The evaluated results were classed as follows.

A: The reflection image showed extremely excellent image quality

B: The reflection image showed good image quality

C: The reflection image showed slightly and partially poor image quality.

D: The reflection image showed poor image quality wholly.

E: The reflection image showed extremely bad image quality wholly.

The evaluated results were shown in following Table 5.

TABLE 5

| Sample Nos. | ΔD < 1.0? | ΔD < 0.7? | Consistency of Gradation | Image Quality | Remarks |
|---|---|---|---|---|---|
| 1-a | NO | NO | C | E | Comparative |
| 2-a | NO | NO | C | E | Comparative |
| 3-a | NO | NO | C | E | Comparative |
| 4-a | NO | NO | C | E | Comparative |
| 5-a | NO | NO | C | E | Comparative |
| 6-a | NO | NO | C | E | Comparative |
| 7-a | NO | NO | C | E | Comparative |
| 8-a | NO | NO | C | E | Comparative |
| 1-b | NO | NO | B | D | Inventive |
| 2-b | NO | NO | B | D | Inventive |
| 3-b | YES | NO | A | C | Inventive |
| 4-b | YES | NO | A | C | Inventive |
| 5-b | YES | NO | A | B | Inventive |
| 6-b | YES | YES | A | A | Inventive |
| 7-b | YES | YES | A | A | Inventive |
| 8-b | YES | YES | A | A | Inventive |

As is apparent from Table 5, Samples satisfying the relation of $\Delta D < 1.0$ showed excellent results in Consistency of Gradation and Image Quality. When Samples satisfying the relation of $\Delta D < 0.7$ showed more excellent result in Image Quality.

[Evaluation 5]

[Graininess in Low-Density Area]

The following Table 6 shows the relation between "Slope γ" of the reflection vs. transmission density characteristic curve and "Graininess in Low Density Area" of the reflection image. "Slope γ" represents a derivative (slope of tangent line) at an arbitrary point in the range of the transmission density being 1.0 or less on the characteristic curve. "YES" of "$\gamma \leqq 2.3$?" means that the derivative at the arbitrary points in the range of the transmission density being 1.0 or less on the characteristic curve were always 2.3 or less. "NO" represents the case other than "YES".

For the evaluation of "Graininess in low density area" of reflection image, Test Pattern 2 of each of Samples was utilized. "Graininess in low density area" of reflection image was evaluated by visually observing the graininess of the low-density area ($Dr < 0.6$) of Test Pattern 2 of each of Samples as the reflection image. Evaluated results were classed as follows.

A: The reflection image showed extremely excellent Graininess

B: The reflection image showed good Graininess

C: Graininess of the reflection image was slightly poor but was acceptable

D: The reflection image showed poor Graininess

E: The reflection image showed extremely poor Graininess

The results were shown in following Table 6.

TABLE 6

| Sample Nos. | γ ≦ 2.3? | Graininess in Low-Density Area | Remarks |
|---|---|---|---|
| 1-a | NO | E | Comparative |
| 2-a | NO | E | Comparative |
| 3-a | NO | E | Comparative |
| 4-a | NO | E | Comparative |
| 5-a | NO | E | Comparative |
| 6-a | NO | E | Comparative |

TABLE 6-continued

| Sample Nos. | γ ≦ 2.3? | Graininess in Low-Density Area | Remarks |
|---|---|---|---|
| 7-a | NO | E | Comparative |
| 8-a | NO | E | Comparative |
| 1-b | NO | C | Inventive |
| 2-b | NO | C | Inventive |
| 3-b | YES | B | Inventive |
| 4-b | YES | A | Inventive |
| 5-b | YES | A | Inventive |
| 6-b | YES | A | Inventive |
| 7-b | YES | A | Inventive |
| 8-b | YES | A | Inventive |

As is apparent from Table 6, Samples satisfying the relation of $\gamma \leqq 2.3$ showed excellent results in Graininess in low density area of the reflection image.

[Evaluation 6]

[Representablity of Blood Vessel and Detectability of Shadow]

The following Table 7 shows the relation between the above described Density Difference ΔD and Representablity of Blood Vessel and Detectability of Shadow in the reflection image. Each of Representablity of Blood Vessel and Detectability of Shadow is one of barometers of Image Quality described Evaluation 4. Representablity of Blood Vessel of the reflection image was evaluated by visually observing Test Pattern 2 of each of Samples as the reflection image, and classed as follows.

A: The blood vessel was represented clearly.

B: A part of fine blood vessels did not represented

C: Most of the fine blood vessels did not represented

Detectability of Shadow in the reflection image was evaluated by visually observing Test Pattern 2 of each of Samples as the reflection image, and classed as follows.

A: Detectability of the shadow was excellent

B: Detectability of the shadow was good

C: Detectability of the shadow was slightly and partially poor

D: Detectability of the shadow was slightly poor wholly, but was acceptable for medical use E: Detectability of the shadow was bad The evaluated results were shown in following Table 7.

TABLE 7

| Sample Nos. | ΔD < 1.0? | ΔD < 0.7? | Represent-ablity of Blood Vessel | Detectability of the shadow | Remarks |
|---|---|---|---|---|---|
| 1-a | NO | NO | C | E | Comparative |
| 2-a | NO | NO | C | E | Comparative |
| 3-a | NO | NO | C | E | Comparative |
| 4-a | NO | NO | C | E | Comparative |
| 5-a | NO | NO | C | E | Comparative |
| 6-a | NO | NO | C | E | Comparative |
| 7-a | NO | NO | C | E | Comparative |
| 8-a | NO | NO | C | E | Comparative |
| 1-b | NO | NO | B | D | Inventive |
| 2-b | NO | NO | B | D | Inventive |
| 3-b | YES | NO | A | C | Inventive |
| 4-b | YES | NO | A | C | Inventive |
| 5-b | YES | NO | A | B | Inventive |
| 6-b | YES | YES | A | A | Inventive |
| 7-b | YES | YES | A | A | Inventive |
| 8-b | YES | YES | A | A | Inventive |

As is apparent from Table 7, Samples satisfying the relation of ΔD<1.0 showed excellent results in Representablity of Blood Vessel and Detectability of Shadow. When Samples satisfying the relation of ΔD<0.7 showed more excellent result in Detectability of Shadow.

<Synthetic Evaluation>

According to the above, it is desirable that, in the characteristic curve of reflection density Dr vs. transmission density Dt of a recording medium after image recording, in the range of Dt≦2.0, reflection density is at least monotonously non-decreasing with transmission density. Further, desirably the density difference ΔD is not greater than 1.0, and more desirably should be not greater than 0.7 in the above-mentioned density range. Further, it is desirable that the gradient of the reflection density vs. transmission density characteristic curve is not greater than 2.3 in the above-mentioned density range. The basis of the density range Dt≦2.0 is as follows. In the case where an image is actually produced, the density range Dt≦2.0 is the density range that is important to diagnosis because it occupies the greater part of a photographic object, and portions of Dt>2.0 are hardly those of the object, but those of the background in most cases. Further, in a gradation producing method for a transmission image, it is desirable to make ink drops approximately superpose one another at the same position, because reflection density is suppressed particularly in low to medium density region.

According to the result of the subjective evaluation, it is desirable that the recording medium is colored in blue but the coloring is limited to some extent. To state it concretely, it is desirable that the density ratio BD/VD of the recording medium is not smaller than 0.25. In the case where a transmission image is observed by a high-luminance light box, even a high density or turbidity of the recording medium does not worry the observer so much, but the higher density or turbidity is rather desirable in the case where both a transmission image and a reflection image are used, because it makes the image easy to observe as the reflection image.

It is desirable that an image has an image quality of a level to enable diagnosis both as a transmission image and as a reflection image; however, because it is extremely difficult to obtain a strict gradation characteristic for both simultaneously, only it is necessary that the image quality has such a level as to make the image usable for reference.

For an X-ray image radiographing apparatus, a CR system and an FPD system have been cited; in addition to them, an X-ray computed tomography apparatus (X-ray CT apparatus), a magnetic resonance imaging apparatus (MRI apparatus), an ultrasonic image diagnostic apparatus, an electronic endoscope, and a fundus camera can be cited, but it is not limited to these.

In this example of the embodiment, explanation has been made for an image recording method in which an image is used mainly as a transmission image and can be also used as a reflection image, but it may be also appropriate an image recording method in which an image is used mainly as a reflection image and can be also used as a transmission image. Further, this invention is not limited to an image for medical use, but in the case of OHP sheet for example, if it can be used both as a transmission image and as a reflection image, it is very convenient because the image can be confirmed as a reflection image without observing the sheet in a light-transmitting manner for confirmation.

Further, this invention has an effect for a color image, but the effect is particularly high for a monochromatic image. Moreover, although the number of the kinds of ink density is limited to 4, but the larger the number of the kinds of ink density becomes, the more it becomes desirable.

EFFECT OF THE INVENTION

As described in the foregoing, by this invention, it is possible to make the reversing of density in the reflection density vs. transmission density characteristic never occur. Further, it is possible to make a large difference not be produced in the gradation characteristic between the transmission density and the reflection density, by suppressing, in the reflection density vs. transmission density characteristic curve, the gradient of the characteristic curve in the low to medium density region. Further, by shooting a plurality of ink drops repeatedly approximately at the same position on a recording medium, controlling the refection density by combining the order of jetting ink drops and the densities of the ink used, and shooting a low-density ink drop last, an image which has a high image quality both as a transmission image and as a reflection image can be produced.

What is claimed is:

1. A recording method of a medical image comprising:

jetting ink onto a recording medium to make the medical image, wherein a reflection density vs. transmission density characteristic curve of the recorded medical image is monotone non-decreasing in the range of the transmission density being not more than 2.0.

2. The recording method of claim 1, wherein the recording medium has a transmission density of 0.15 to 0.40.

3. The recording method of claim 2, wherein a visual density VD of the recoding medium and a blue light density BD of the recording medium satisfy the following relation:

$$BD/VD \geqq 0.25.$$

4. The recording method of claim 1, wherein the difference between the transmission density and the reflection density of the same point of the recorded medical image is not more than 1.0 in the range of the transmission density being not more than 2.0.

5. The recording method of claim 4, wherein the difference between the transmission density and the reflection density is not more than 0.7.

6. The recording method of claim 4, wherein, in the jetting step, a plurality of ink drops are jetted onto substantially same point of the recording medium.

7. The recording method of claim 6, wherein the medical image is recorded in a resolution of not less than 360 dots/25.4 mm.

8. The recording method of claim 1, wherein a slope of tangent line of a point in the range of the transmission density being not more than 1.0 on the reflection density vs. transmission density characteristic curve is not more than 2.3.

9. A recording method of a medical image comprising:

jetting ink onto a recording medium to make the medical image, wherein the difference between a transmission density and a reflection density of the same point of the recorded medical image is not more than 1.0 in the range of the transmission density being not more than 2.0.

10. The recording method of claim 9, wherein the difference between the transmission density and the reflection density is not more than 0.7.

11. The recording method of claim 9, wherein, in the jetting step, a plurality of ink drops are jetted onto substantially same point of the recording medium.

12. The recording method of claim 11, wherein the medical image is recorded in a resolution of not less than 360 dots/25.4 mm.

13. An apparatus to recording a medical image onto a recording medium by the recording method described in claim 1, the apparatus comprising a plurality of recording heads being capable of jetting a plurality of inks having the same color hue and different concentrations from each other, wherein the recording heads are arrayed in the approximately perpendicular direction to the conveying direction of the recording medium, and in the order of the concentration of the inks in the recording heads.

14. The apparatus of claim 13, wherein the recording heads repeatedly move backwards and forwards in the approximately perpendicular direction to the conveying direction of the recording medium, the recording heads jet the ink on one way of the backwards movement and the forwards movement, and the recording head are arrayed in descending order of the concentration of the inks in the recording heads along the way, on which the ink is jetted.

* * * * *